(12) United States Patent
Machida et al.

(10) Patent No.: US 10,838,855 B2
(45) Date of Patent: Nov. 17, 2020

(54) STORAGE SYSTEM AND STORAGE CONTROL METHOD

(71) Applicant: HITACHI, LTD., Tokyo (JP)

(72) Inventors: Naoya Machida, Tokyo (JP); Shigeo Homma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/328,145

(22) PCT Filed: Feb. 20, 2017

(86) PCT No.: PCT/JP2017/006034
§ 371 (c)(1),
(2) Date: Feb. 25, 2019

(87) PCT Pub. No.: WO2018/150561
PCT Pub. Date: Aug. 23, 2018

(65) Prior Publication Data
US 2019/0196962 A1    Jun. 27, 2019

(51) Int. Cl.
*G06F 12/00* (2006.01)
*G06F 12/02* (2006.01)
(Continued)

(52) U.S. Cl.
CPC .......... *G06F 12/0246* (2013.01); *G06F 3/064* (2013.01); *G06F 3/0616* (2013.01); *G06F 3/0688* (2013.01); *G06F 3/0689* (2013.01); *G06F 3/08* (2013.01); *G06F 12/00* (2013.01); *G06F 12/02* (2013.01); *G06F 2212/1016* (2013.01); *G06F 2212/7202* (2013.01)

(58) Field of Classification Search
CPC ...... G06F 12/0246; G06F 12/00; G06F 12/02; G06F 3/08; G06F 3/0689; G06F 3/0688; G06F 3/0616; G06F 3/064; G06F 2212/1016; G06F 2212/7202
See application file for complete search history.

(56) References Cited

U.S. PATENT DOCUMENTS

2002/0152181 A1* 10/2002 Kanai ................... G06Q 30/02
  705/80
2008/0098193 A1   4/2008 Im et al.
(Continued)

FOREIGN PATENT DOCUMENTS

JP     2008-102900 A    5/2008
JP     2011-505046 A    2/2011
(Continued)

*Primary Examiner* — Kalpit Parikh
(74) *Attorney, Agent, or Firm* — Volpe Koenig

(57) ABSTRACT

This storage system has one or more non-volatile memory devices and a processor unit that comprises one or more processors connected to the one or more non-volatile memory devices. At least a portion of the non-volatile memory of each of the one or more non-volatile memory devices comprises a user area, which is a storage area to which data is written, and an update area, which is a storage area to which update data for the original data is written. The processor unit changes the user capacity, namely the capacity of the user area, of each of the one or more non-volatile memory devices on the basis of at least one of one or more resource usage rates of the one or more non-volatile memory devices.

11 Claims, 16 Drawing Sheets

(51) Int. Cl.
*G06F 3/08* (2006.01)
*G06F 3/06* (2006.01)

(56) References Cited

U.S. PATENT DOCUMENTS

| | | |
|---|---|---|
| 2009/0138671 A1 | 5/2009 | Danilak |
| 2014/0101379 A1 | 4/2014 | Tomlin |
| 2016/0019159 A1 | 1/2016 | Ueda et al. |
| 2016/0062684 A1 | 3/2016 | Danilak |
| 2016/0259594 A1 | 9/2016 | Takahashi et al. |
| 2017/0262365 A1* | 9/2017 | Kanno ................ G06F 3/0619 |
| 2018/0018113 A1 | 1/2018 | Koseki et al. |

FOREIGN PATENT DOCUMENTS

| | | |
|---|---|---|
| JP | 2014-513356 A | 5/2014 |
| JP | 2016-162397 A | 9/2016 |
| WO | 2015/052811 A | 4/2015 |
| WO | 2016/181528 A | 11/2016 |

\* cited by examiner

FIG. 6

Table area 402

Drive management table 421

| Drive # 501 | Drive type 502 | Physical capacity 503 |
|---|---|---|
| 1 | FMPK | 4TB |
| 2 | FMPK | 4TB |
| ... | ... | ... |

Pool management table 422

| Pool # 511 | PG # 512 |
|---|---|
| 1 | 1,2 |
| 2 | 3 |
| ... | ... |

PG management table 424

| PG # 521 | RAID level 522 | RAID configuration 523 | Drive list 524 | Policy 525 | OP rate 526 | PG capacity 527 |
|---|---|---|---|---|---|---|
| 1 | RAID1 | 2D+2D | 1,2,14,15 | Capacity prioritized | 20% | 14.5TB |
| 2 | RAID1 | 2D+2D | 10,11,16,17 | Performance prioritized | 25% | 13.8TB |
| 3 | RAID6 | 6D+2P | 3,4,5,6,7,8 | Performance prioritized | 25% | 51.2TB |
| ... | ... | ... | ... | ... | ... | ... |

Drive individual management table 425

| Drive # 531 | LBA 532 | Length 533 |
|---|---|---|
| 1 | 0 | 1GB |
| 1 | 2097152 | 1GB |
| 1 | 4194304 | 2GB |
| ... | ... | ... |

Virtual volume management table 423

| Volume # 541 | Pool # 542 | Capacity 543 |
|---|---|---|
| 1 | 1 | 1GB |
| 2 | 1 | 1GB |
| 3 | 1 | 2GB |
| ... | ... | ... |

Table area 602

OP rate management table 624

| OP rate 701 | User capacity 702 |
|---|---|
| 20% | 3.2TB |

Asynchronous performance management table 625

| ID 711 | Period 712 | Reclamation 713 | Refresh 714 |
|---|---|---|---|
| 1 | 2016/9/14 14:00:00 | 30KIOPS | 2KIOPS |
| 2 | 2016/9/14 14:30:00 | 30KIOPS | 3KIOPS |
| 3 | 2016/9/14 15:00:00 | 50KIOPS | 2KIOPS |
| ... | ... | ... | ... |

FM resource management table 622

| ID 721 | Period 722 | Memory 723 | CPU 724 | Bus bandwidth 725 | Cache usage rate 726 | Cache bandwidth 727 |
|---|---|---|---|---|---|---|
| 1 | 2016/9/14 14:00:00 | 80% | 90% | 40% | 50% | 25% |
| 2 | 2016/9/14 14:30:00 | 90% | 85% | 40% | 50% | 30% |
| 3 | 2016/9/14 15:00:00 | 80% | 100% | 40% | 50% | 25% |
| ... | | | | | | |

Logical-physical translation table 621

| Logical page # 731 | LBA 732 | Logical page size 733 | Status 734 | Physical page # 735 | Block # 736 |
|---|---|---|---|---|---|
| 1 | 0 | 16K | Valid | 1 | 1 |
| 2 | 8192 | 16K | Valid | 3 | 3 |
| 3 | 16384 | 16K | Invalid | N/A | N/A |
| ... | ... | ... | ... | ... | ... |

Page management table 623

| Physical page # 741 | Status 742 |
|---|---|
| 1 | Valid |
| 2 | Invalid |
| 3 | Valid |
| 4 | Empty |
| ... | ... |

FIG. 18

Extensibility/reducibility determination table 426

|  |  | FM resource usage rate | | |
|---|---|---|---|---|
|  |  | 10% | 50% | 100% |
| Asynchronous processing performance | L | Extensible | Extensible | Not possible |
|  | M | Extensible | Not possible | Reducible |
|  | H | Not possible | Reducible | Reducible |

High, medium, and low thresholds differ according to policy. For example:
    When performance prioritized H:25KIOPS M:20KIOPS L:15KIOPS
    When capacity prioritized      H:50KIOPS M:40KIOPS L:30KIOPS

FIG. 19

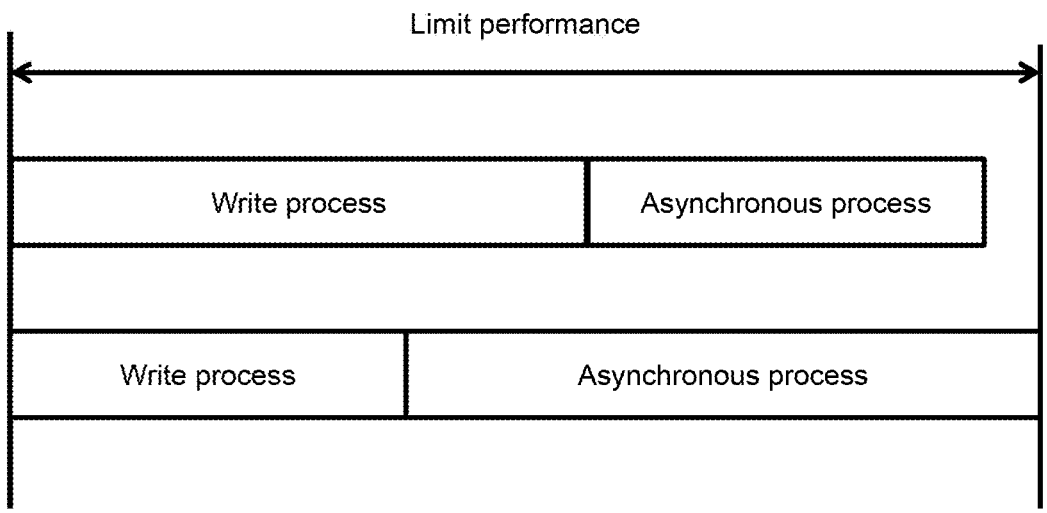

STORAGE SYSTEM AND STORAGE CONTROL METHOD

TECHNICAL FIELD

The present invention generally relates to storage control and, for example, relates to changing a capacity of a spare region for over provisioning.

BACKGROUND ART

A flash memory is generally blockwise-erase type or, in other words, rewriting data requires that the data be erased from a region in which the data is stored. There is an upper limit to the number of rewrites (in other words, the number of erases) of data with respect to a flash memory. With a flash memory of which the upper limit is exceeded, data cannot be newly written or a rate at which an error occurs in written data increases. A period until the number of rewrites of a flash memory reaches its upper limit is referred to as a "lifetime" of the flash memory. Therefore, an FMPK (Flash Memory Package) constituted by a plurality of flash memories also has a lifetime.

PTL 1 discloses a technique in which a sum of a usable capacity and a surplus capacity is adopted as a total storage capacity of a RAID group and a size of the surplus capacity is changed in accordance with a rewrite frequency to a logical volume.

CITATION LIST

Patent Literature

[PTL 1]
WO 2015/052811

SUMMARY OF INVENTION

Technical Problem

Applications of storage systems vary and, for example, a storage system storing data with a low rewrite frequency (data that is mainly read) enables a bit cost to be reduced by reducing an update region (a spare region) and expanding a user region (a data storage region).

However, when an update region of an FMPK is reduced more than necessary, depending on a total amount of update data to be written (data to be overwritten) to the FMPK, an execution frequency of an asynchronous process increases. As a result, I/O performance (performance of a process for performing I/O with respect to the FMPK in response to an I/O request) of the storage system declines (in this case, the asynchronous process refers to a process performed by the FMPK asynchronously with a write process that is performed by the FMPK in response to a write command having data such as update data as a write target and, typically, refers to a process that generates write of data with respect to an FM (flash memory) such as a reclamation process and a refresh process).

On the other hand, when the update region of the FMPK is increased more than necessary, since the user region of the FMPK decreases, an amount of data that can be written into the FMPK is reduced.

Such problems are not limited to flash memory devices such as an FMPK and may also apply to other blockwise-erase non-volatile memory devices.

An object of the present invention is to achieve compatibility between retention of host I/O performance and reduction of bit cost.

Solution to Problem

A storage system includes one or more non-volatile memory devices and a processor unit constituted by one or more processors connected to the one or more non-volatile memory devices. With respect to each of the one or more non-volatile memory devices, at least a part of a non-volatile memory is constituted by a user area that is a storage area to which data is written and an update area that is a storage area to which update data for the data is written. The processor unit changes a user capacity that is a capacity of a user area for each of the one or more non-volatile memory devices based on at least one of one or more resource usage rates of the one or more non-volatile memory devices.

Advantageous Effects of Invention

It is possible to Retain the optimal user capacity (in other words, an update capacity that is a capacity of an update region) for an operating situation of one or more non-volatile memory devices during operation of a storage system. As a result, it is expected that a compatibility between retention of host I/O performance and reduction of bit cost can be maintained.

BRIEF DESCRIPTION OF DRAWINGS

FIG. 6 shows a configuration of tables stored in a table area of a storage controller.
FIG. 8 shows a configuration of tables stored in a table area of an FMPK controller.
FIG. 18 shows a configuration of an extensibility/reducibility determination table.
FIG. 19 shows an example of a relationship between performance of a write process and performance of an asynchronous process.

DESCRIPTION OF EMBODIMENTS

Figure 1:
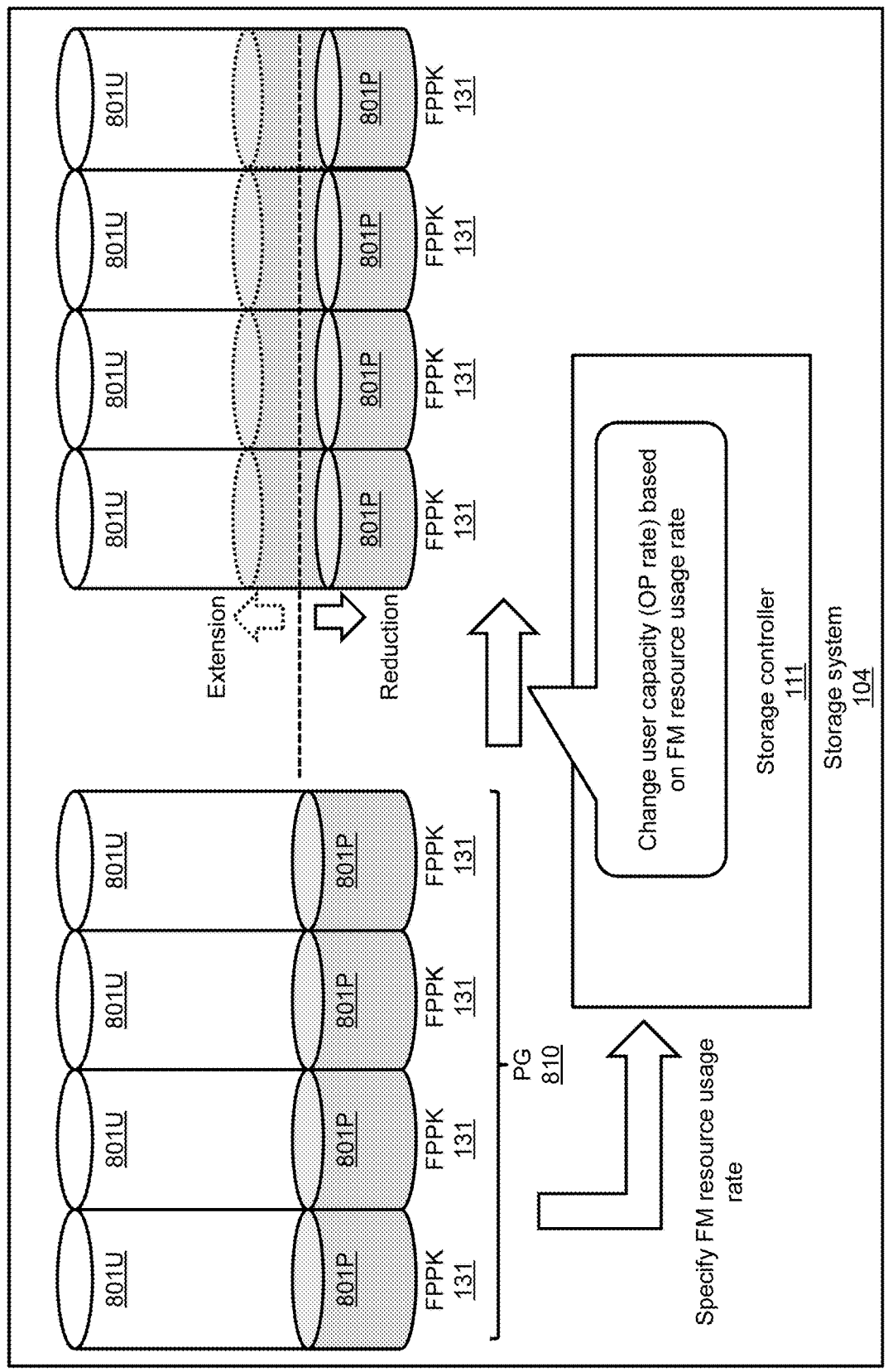
FIG. 1 shows an outline of a first embodiment.

Although information will be described below using expressions such as an "abc table", information may be expressed by data configurations other than a table. At least one of "abc tables" can be referred to as "abc information" in order to show that information is not dependent on data configuration. In addition, in the following description, a configuration of each table represents an example and one table may be divided into two or more tables and all of or a part of two or more tables may constitute one table.

Furthermore, in the following description, an "interface unit" includes one or more interfaces. The one or more interfaces may be one or more interface devices of a same type (for example, one or more NIC (Network Interface Card)) or two or more interface devices of different types (for example, an NIC and an HBA (Host Bus Adapter)).

In addition, in the following description, a "storage unit" includes one or more memories. At least one memory with respect to the storage unit may be a volatile memory. The storage unit is mainly used during processing by a processor unit.

Furthermore, in the following description, a "processor unit" includes one or more processors. Typically, at least one processor is a microprocessor such as a CPU (Central Processing Unit). Each of the one or more processors may be a single-core processor or a multi-core processor. A processor may include a hardware circuit which performs a part of or all of a process.

In addition, while a "program" is sometimes used as a subject when describing a process in the following description, since a program causes a prescribed process to be performed by appropriately using a storage unit (such as a memory) and/or an interface unit (such as a communication port) and the like when being executed by a processor unit, a "processor" may be used instead as a subject of a process. A process described using a program as a subject may be considered a process performed by a processor unit or by an apparatus including the processor unit. Furthermore, the processor unit may include a hardware circuit (for example, an FPGA (Field-Programmable Gate Array) or an ASIC (Application Specific Integrated Circuit)) that performs a part of or all of a process. A program may be installed in an apparatus such as a computer from a program source. The program source may be, for example, a program distribution server or a recording medium (for example, a non-transitory recording medium) that can be read by a computer. In addition, in the following description, two or more programs may be realized as one program or one program may be realized as two or more programs.

Furthermore, in the following description, a "storage system" may be constituted by one or more storage apparatuses. A "storage apparatus" need only be an apparatus equipped with a function for storing data in a storage device. For this reason, the storage apparatus may be a computer (for example, a general-purpose computer) such as a file server. For example, at least one physical storage apparatus may execute a virtual computer (for example, a VM (Virtual Machine)) or may execute an SDx (Software-Defined anything). As an SDx, for example, an SDS (Software Defined Storage: an example of a virtual storage apparatus) or an SDDC (Software-defined Datacenter) can be adopted. In addition, for example, at least one storage apparatus (computer) may have a hypervisor. The hypervisor may generate a server VM (Virtual Machine) that operates as a server and a storage VM that operates as a storage. The server VM may operate as a host computer that issues an I/O request and the storage VM may operate as a storage controller that performs I/O with respect to an FMPK in response to an I/O request from the server VM.

In addition, while a "time point" is expressed in units of year, month, day, hour, minute, and second in the following description, a unit of time point may be set broader or finer or a different unit may be used.

Example 1

FIG. 1 shows an outline of a first embodiment.

A storage system 104 has a parity group (hereinafter, a PG) 810 and a storage controller 111 which controls I/O (Input/Output) with respect to the PG 810.

The PG 810 is constituted by a plurality of FMPKs (Flash Memory Packages) 131 and is also referred to as a RAID (Redundant Array of Independent (or Inexpensive) Disks) group.

Each FMPK 131 has an FM (flash memory) and a plurality of resources including resources of a plurality of types (for example, a processor and a memory). Hereinafter, with respect to each FMPK 131, resources other than an FM will be generally referred to as "FM resources".

In each FMPK 131, the FM has a user area 801U and an update area 801P. The user area 801U is a storage area into which data (for example, data of a new file) is written. The update area 801P is a storage area into which update data for the data (for example, update data of the file) is written. Hereinafter, with respect to each FMPK 131, a capacity of the user area 801U will be referred to as a "user capacity" and a capacity of the update area 801P will be referred to as an "update capacity". It should be noted that the FM may include an area other than the user area 801U and the update area 801P.

In each FMPK 131, a sum of the user capacity and the update capacity is constant. Therefore, when the user capacity increases, the update capacity decreases, and when the user capacity decreases, the update capacity increases.

When the update area 801P of the FMPK 131 is reduced more than necessary, depending on a total amount of update data to be written to the FMPK 131, an execution frequency of the asynchronous process increases. Therefore, a host I/O performance (performance of a process for performing I/O with respect to the FMPK 131 in response to an I/O request from a host computer 101) of the storage system 104 declines. On the other hand, when the update area 801P of the FMPK 131 is increased more than necessary, since the user area 801U of the FMPK 131 decreases, an amount of data that can be written into the FMPK 131 is reduced.

In consideration thereof, the storage controller 111 specifies at least one of a plurality of FM resource usage rates of the plurality of FMPKs 131 that constitute the PG 810 and, based on the specified FM resource usage rate, changes the user capacity with respect to each of the plurality of FMPKs 131. Changing a user capacity corresponds to either extending (increasing) the user capacity or reducing (decreasing) the user capacity.

In the present embodiment, a change in the user capacity corresponds to a change in an OP (Over Provisioning) rate. The OP rate is a rate determined based on at least two of a user capacity, an update capacity, and a physical capacity (a sum of the user capacity and the update capacity), and when the user capacity becomes larger, a value of the OP rate becomes smaller. In the present embodiment, OP rate=(update capacity)/(user capacity) is adopted as a calculation formula of the OP rate. Therefore, extending the user capacity is to lower the OP rate and reducing the user capacity is to raise the OP rate. Other calculation formulas such as OP rate=((physical capacity)/(user capacity))−1 may be adopted as the calculation formula of the OP rate.

During operation of the storage system 104, an update capacity adequate for each FMPK 131 in the PG 810 may change depending on a situation of I/O with respect to the PG 810. On the other hand, in the PG 810, the OP rate of each FMPK 131 remains the same. At least a part of a logical storage space based on a PG user area (a set of a plurality of user areas 801U respectively included in the plurality of FMPKs 131 in the PG 810) is used as a logical volume.

In consideration thereof, the storage controller 111 changes the OP rate of each FMPK 131 in PG units.

Hereinafter, the present embodiment will be described in detail.

Figure 2:
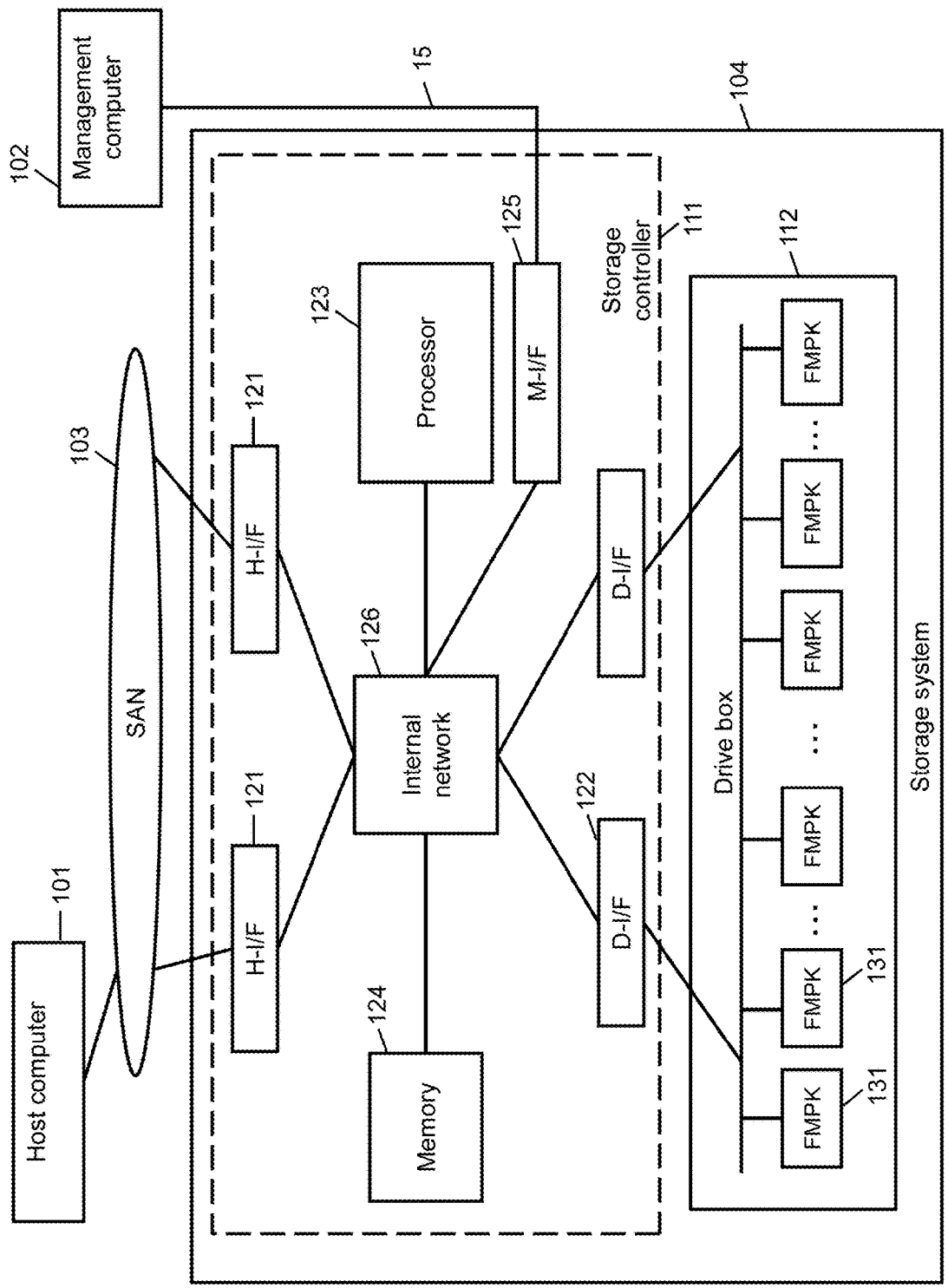
FIG. 2 shows a configuration example of a storage system.

FIG. 2 shows a configuration of the storage system 104. It should be noted that in the following description, in order to avoid confusion, a request from the host computer 101 to the storage system 104 will be referred to as a "request" and a request from the storage controller 111 to the FMPK 131 will be referred to as a "command".

The host computer 101 and a management computer 102 are coupled to the storage system 104. For example, the host computer 101 is coupled to the storage system 104 via a communication network such as a SAN (Storage Area Network) 103. For example, the management computer 102 is coupled to the storage system 104 through a prescribed communication line 15 (or a communication network such as a LAN (Local Area Network)).

The host computer 101 writes data to the storage system 104 by transmitting a write request to the storage system 104. The host computer 101 reads data from the storage system 104 by transmitting a read request to the storage system 104. The host computer 101 may be an example of an issuance source of an I/O request (a write request or a read request). For example, in a storage system that executes the server VM and the storage VM described earlier, the server VM may be an issuance source of an I/O request.

The management computer 102 is an apparatus that enables a user to manage and control the storage system 104. The management computer 102 may include input devices such as a keyboard and a mouse and an output device such as a display device.

The storage system 104 includes the storage controller 111 and a drive box 112. The drive box 112 includes the plurality of FMPKs 131.

The storage controller 111 includes an H-I/F (interface) 121, a processor 123, a memory 124, a D-I/F 122, and an M-I/F 125, and the elements 121 to 125 are coupled via an internal network 126 which enables data transmission and reception. The H-I/F 121, the D-I/F 122, and the M-I/F 125 are examples of the interface unit. The memory 124 is an example of the storage unit. The processor 123 is an example of the processor unit.

The H-I/F 121 is an I/F for coupling the host computer 101 to the storage controller 111. The M-I/F 125 is an I/F for coupling the management computer 102 to the storage controller 111. A D-I/F 122 is an I/F for coupling the FMPK 131 to the storage controller 111.

The processor 123 executes a computer program (hereinafter, a program) and the like. The various functions included in the storage system 104 are realized as the processor executes the program.

The memory 124 stores data. While the memory 124 is, for example, a volatile semiconductor memory such as a DRAM (Dynamic Random Access Memory), the memory 124 may be a non-volatile semiconductor memory such as a flash memory. The program and data stored in the memory 124 are accessed by the processor 123, the H-I/F 121, the D-I/F 122, and the like.

Figure 3:
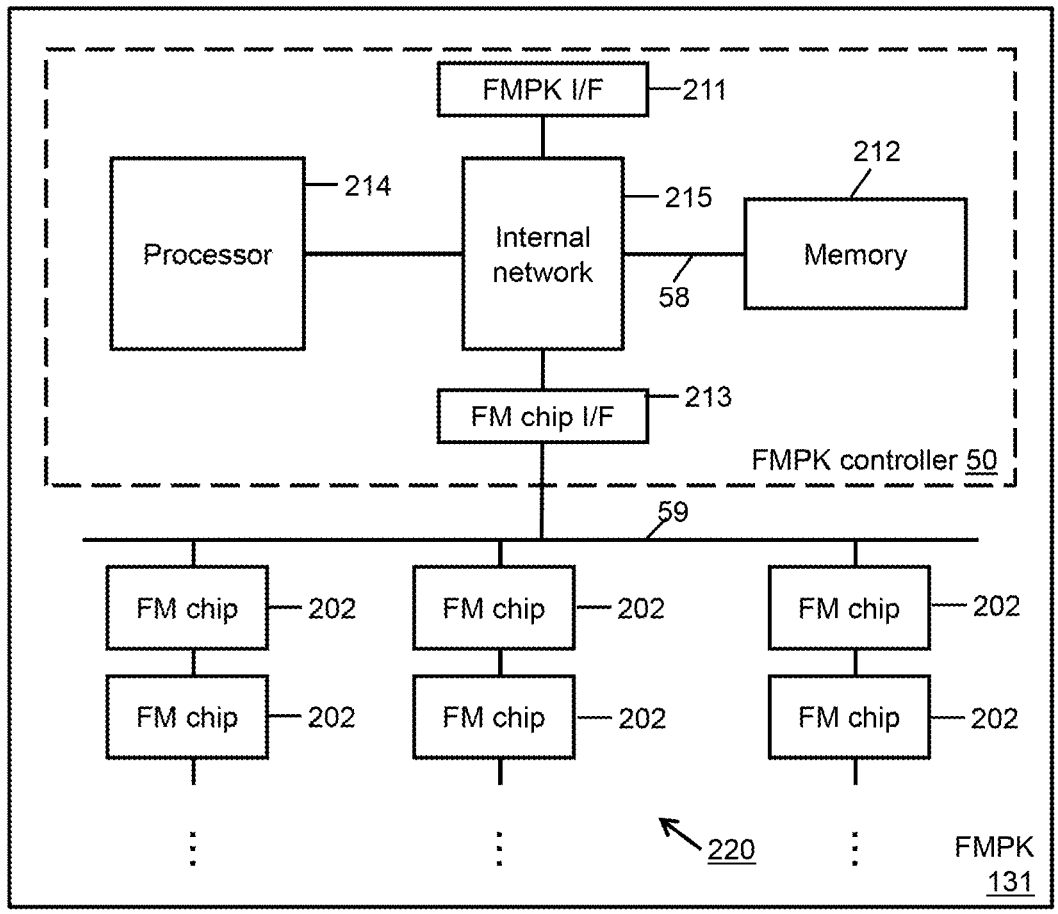
FIG. 3 shows a configuration of an FMPK.

FIG. 3 shows a configuration of the FMPK 131.

The FMPK 131 includes an FM 220 and an FMPK controller 50 coupled to the FM 220. The FM 220 is constituted by a plurality of FM (flash memory) chips 202.

The FMPK controller 50 includes a processor 214, a memory 212, an FMPK I/F 211, and an FM chip I/F 213. These elements 211 to 214 are coupled via an internal network 215 which enables data transmission and reception and which is capable of transmitting and receiving data in both directions. Hereinafter, a bus 58 which couples the memory 212 to the internal network 215 will be particularly referred to as a "cache bus 58".

The processor 214 executes a program and the like. The various functions included in the FMPK 131 are realized as the processor 214 executes the program.

The memory 212 stores data. While the memory is, for example, a volatile semiconductor memory such as a DRAM, the memory may be a non-volatile semiconductor memory such as a flash memory. The program and data stored in the memory 212 are accessed by the processor 214, the FMPK I/F 211, the FM chip I/F 213, and the like.

The FMPK I/F 211 is an I/F for coupling the FMPK 131 to the storage controller 111. The FM chip I/F 213 is an I/F for coupling the FM chip 202 to the FMPK controller 50 (the processor). Hereinafter, a bus 59 which couples the FM chip 202 to the FM chip I/F 213 will be particularly referred to as an "FM bus 59".

The elements 211 to 215 and 58 and 59 are respectively the plurality of FM resources.

Figure 4:
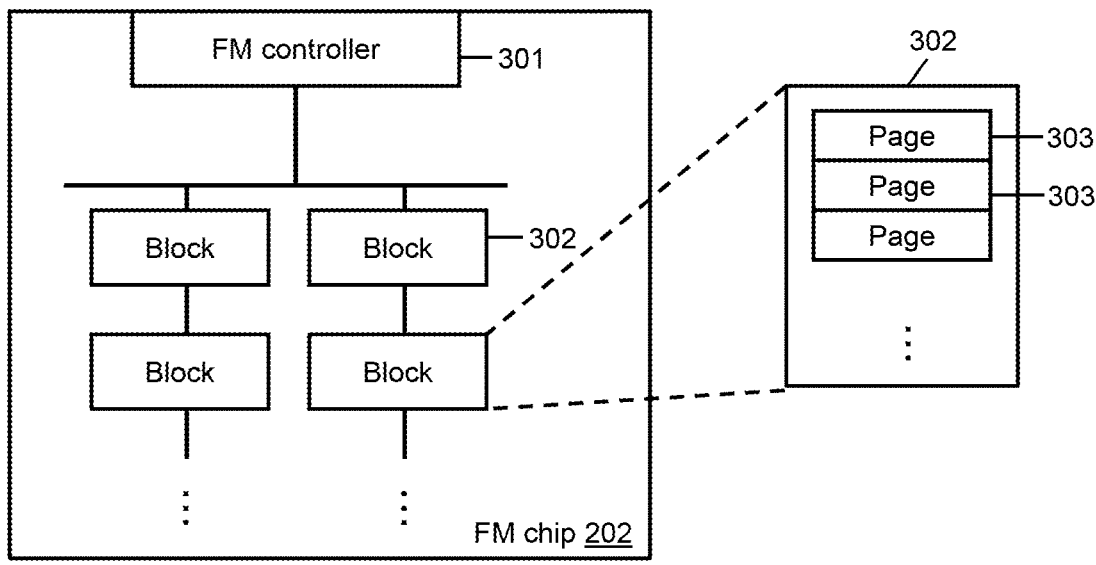
FIG. 4 shows a configuration of an FM chip.

FIG. 4 shows a configuration of the FM chip 202.

The FM chip 202 is, for example, a NAND type FM chip and includes an FM controller 301 and a plurality of blocks (physical blocks) 302. In addition, the block 302 is constituted by a plurality of pages (physical pages) 303. Due to characteristics of the FM chip 202, data must be read and written in page units. In addition, due to characteristics of the FM chip 202, data must be erased in block units.

Furthermore, the FM chip 202 is blockwise-erase type or, in other words, unable to overwrite data with respect to a written page 303. Therefore, when the FMPK controller 50 receives a write command having, as a write destination, a logical address to which a physical address of the written page 303 is allocated, the FMPK controller 50 writes update data (data to be overwritten) in accordance with the write command to an unused page 303 and allocates a physical address of the page 303 to the logical address of the write destination instead of the physical address of the written page 303.

While a higher-level system of the FMPK 131 is the storage controller 111 in the present embodiment, the higher-level system need not be limited thereto. In other words, the higher-level system may be a computer to which the FMPK 131 is externally mounted in the storage system or a processor inside a computer incorporating the FMPK 131.

The FMPK controller 50 provides the higher-level system with a logical storage space (for example, a continuous logical address space). The logical storage space may be divided into a plurality of logical areas. For example, the logical storage space may be constituted by a plurality of logical blocks and each logical block may be constituted by a plurality of logical pages. The logical block or the logical page may be an example of a logical area. The logical area may be rephrased as a logical address range (for example, one or more consecutive logical addresses). The FMPK controller 50 manages a correspondence between logical addresses and physical addresses. The FMPK controller 50 specifies a physical area to which belongs a physical address corresponding to a logical address designated in an I/O command from the higher-level system and performs I/O with respect to the specified physical area. For example, while the logical address is an LBA (Logical Block Address), the logical address may be a logical area ID (for example, a logical page number) in place of or in addition to an LBA. For example, while the physical address is a PBA (Physical Block Address), the physical address may be a physical area ID (for example, a physical page number) in place of or in addition to a PBA. When a logical region to which is allocated a page 303 inside the user area 801U is a write destination, an empty page 303 inside the update area 801P is newly allocated in place of the allocated page 303 to the write destination logical area and the update data is written to the newly allocated page 303. With respect to each logical area, data written to a last allocated page 303 (in other words, latest data) is "valid data" and the page 303 in which valid data is written is a "valid page", and data stored in a previously allocated page 303 is "invalid data" and the page 303 in which invalid data is written is an "invalid page". In addition, a page which is neither a valid page nor an invalid page and which is capable of newly storing data is an "empty page".

In addition, in place of the FM 220, a non-volatile memory other than an FM such as a PRAM (Phase-change Random Access Memory), an MRAM (Magnetoresistive Random Access Memory), a ReRAM (Resistive Random Access Memory), or a FeRAM (Ferroelectric Random Access Memory) may be adopted.

Figure 5:
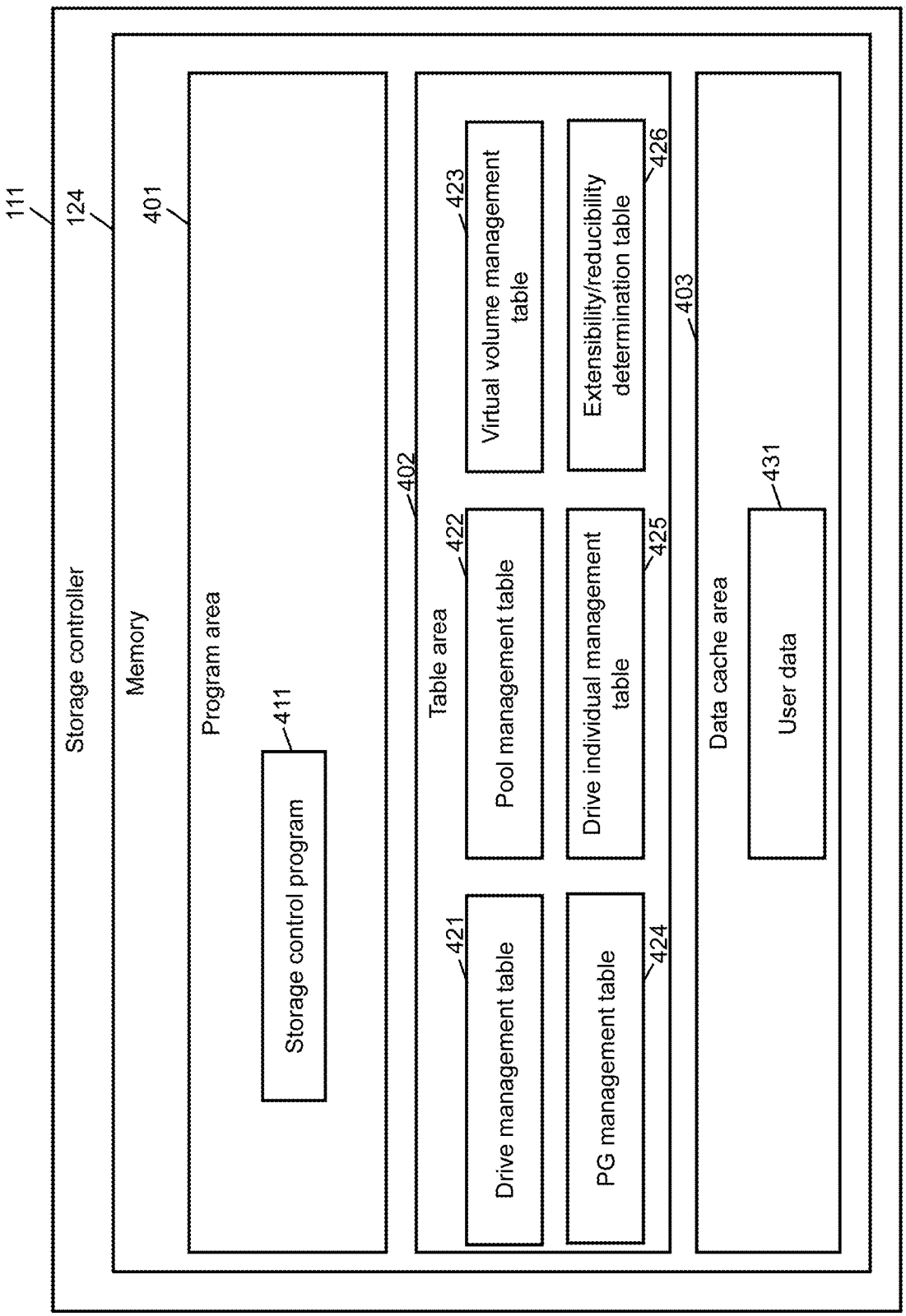
FIG. 5 shows a configuration of a memory of a storage controller.

FIG. 5 shows a configuration of the memory 124 of the storage controller 111.

The memory 124 has a program area 401, a table area 402, and a data cache area 403.

The program area 401 stores a program such as a storage control program 411 which controls operations of the storage controller 111. The program is executed by the processor 123. For example, the storage control program 411 executes a process of writing data to the FMPK 131 in accordance with a write request from the host computer 101. In addition, for example, the storage control program 411 executes a process of reading data from the FMPK 131 and returning the read data to the host computer 101 in accordance with a read request from the host computer 101.

The table area 402 stores tables such as a drive management table 421, a pool management table 422, a virtual volume management table 423, a PG management table 424, a drive individual management table 425, and an extensibility/reducibility determination table 426. The tables will be described in detail later.

The data cache area 403 temporarily stores user data 431. The user data 431 is data in accordance with an I/O request (specifically, data that is a write target or a read target).

FIG. 6 shows a configuration of the tables stored in the table area 402 of the storage controller 111. As shown in FIG. 6, a configuration of the extensibility/reducibility determination table 426 is shown in FIG. 18.

The drive management table 421 holds information related to drives (in the present embodiment, the FMPKs 131). The drive management table 421 has an entry for each drive. Each entry holds information such as a drive number 501, a drive type 502, and a physical capacity 503. The drive number 501 is an identification number of a drive. The drive type 502 indicates a type of the drive. The physical capacity 503 indicates a physical capacity of the drive.

The pool management table 422 holds information related to pools. The pool management table 422 has an entry for each pool. Each entry holds information such as a pool number 511 and a PG number 512. The pool number 511 is an identification number of a pool. The PG number 512 is an identification number of a PG that provides a pool volume in the pool. In the present embodiment, a pool is a storage space constituted by a logical volume based on a PG user area of the PG 810. A logical volume constituting a pool is referred to as a "pool volume". A pool (a pool volume) is divided into a plurality of segments (hereinafter, physical segments). A physical segment is allocated to a write destination virtual segment in a virtual volume (for example, a virtual logical volume in accordance with Thin Provisioning) from a pool which the virtual volume is associated with.

The PG management table 424 holds information related to PGs. The PG management table 424 has an entry for each PG. Each entry holds information such as a PG number 521, a RAID level 522, a RAID configuration 523, a drive list 524, a policy 525, an OP rate 526, and a PG capacity 527. The PG number 521 is an identification number of a PG. The RAID level 522 indicates a RAID level. The RAID configuration 523 indicates a RAID configuration. A RAID type is defined by the RAID level and the RAID configuration. The drive list 524 is a list of identification numbers of drives constituting the PG. The policy 525 indicates a policy associated with the PG. Policies include capacity prioritized and performance prioritized. Each policy will be described later. The OP rate 526 indicates an OP rate adopted with respect to the PG. The PG capacity 527 represents a sum of a plurality of physical capacities respectively corresponding to the plurality of FMPKs 131 constituting the PG. A capacity of a PG user area is calculated from the PG capacity 527 and the OP rate 526.

The drive individual management table 425 exists for each drive. For each drive area, the drive individual management table 425 holds information such as a drive number 531, an LBA (Logical Block Address) 532, and a length 533. The drive number 531 is an identification number of a drive that has a drive area. The LBA 532 indicates an LBA of a head of the drive area. The length 533 indicates a size of the drive area.

The virtual volume management table 423 holds information related to virtual volumes. The virtual volume management table 423 has an entry for each virtual volume. Each entry holds information such as a volume number 541, a pool number 542, and a capacity 543. The volume number 541 is an identification number of a virtual volume. The pool number 542 is an identification number of a pool associated with the virtual volume. The capacity 543 indicates a capacity of the virtual volume.

As shown in FIG. 18, the extensibility/reducibility determination table 426 indicates a relationship among an FM resource usage rate, an asynchronous processing performance, and a result of an extensibility/reducibility determination to be described later. In other words, in the present embodiment, a change of the OP rate is based in an asynchronous processing performance in addition to an FM resource usage rate. The OP rate (a size of an update capacity) affects an occurrence frequency of the asynchronous process. Therefore, by making a change in the OP rate based on the asynchronous processing performance in addition to the FM resource usage rate, it is further expected that an optimal OP rate may be maintained during an operation of the storage system 104. An example of a relationship between performance of a write process (a process performed in response to a write command) and performance of an asynchronous process is as shown in FIG. 19. Specifically, when there is leeway in the performance of the FMPK 131 (when there is a sufficient difference between a sum of a write processing performance and an asynchronous processing performance, and a limit performance of the FMPK), the performance of a write process does not decline even when the performance (a load) of the asynchronous process increases. However, when there is no leeway in the performance of the FMPK 131, the performance of a write process declines when the performance of the asynchronous process increases.

There are N-number of usage rate ranges as an FM resource usage rate range (hereinafter, a usage rate range) and M-number of performance ranges as an asynchronous processing performance range (hereinafter, a performance range). Both N and M need only be integers equal to or larger than 2 and, at the same time, N and M may be a same value or may be different values. In the present embodiment, N=3 and M=3.

The usage rate range includes a first usage rate range (lower than a usage rate X (for example, X is 10%)), a second usage rate range (equal to or higher than the usage rate X and lower than a usage rate Y (for example, Y is 50%)), and a third usage rate range (equal to or higher than the usage rate Y). The usage rate range is compared with a highest (worst) FM resource usage rate among the FM resource usage rates of a plurality of types (a memory 723 to a cache bandwidth 727). Since the highest (worst) FM resource usage rate is considered a bottleneck in the FMPK 131 and such an FM resource usage rate is taken into consideration, a possibility of setting the OP rate in PG units to an optimal value can be increased.

The performance range includes a first performance range (lower than a performance A), a second performance range (equal to or higher than the performance A and lower than a performance B), and a third performance range (equal to or higher than the performance B). It should be noted that H, M, and L in the diagram respectively mean high, medium, and low.

According to FIG. 18, when the FM resource usage rate is low and the asynchronous processing performance is low, a result of an extensibility/reducibility determination tends to be "extensible". In other words, when both the FM resource usage rate and the asynchronous processing performance have leeway, when the user area increases, a further reduction in bit cost is expected and, at the same time, it is expected that an increase in the occurrence frequency of the asynchronous process does not pose a problem. On the other hand, when the FM resource usage rate is high but the asynchronous processing performance is low, a result of an extensibility/reducibility determination tends to be "reducible". In other words, when neither the FM resource usage rate nor the asynchronous processing performance has leeway, when the update region increases, a decline in the occurrence frequency of the asynchronous process is expected. Specifically, when the FM resource usage rate is lower than the usage rate X (an example of the first usage rate) and the asynchronous processing performance is lower than the performance A (an example of the first processing performance), the result of an extensibility/reducibility determination is extensible. On the other hand, when the FM resource usage rate is equal to or higher than the usage rate Y (an example of the second usage rate) and the asynchronous processing performance is equal to or higher than the performance B (an example of the second processing performance), the result of an extensibility/reducibility determination is reducible.

Determination results include "not possible" (neither extension nor reduction is possible) in addition to "extensible" and "reducible".

In addition, a boundary value of at least one performance range or, in other words, at least one of performances A and B differs depending on the adopted policy or, in other words, whether capacity prioritized or performance prioritized is adopted. "Capacity prioritized" means that the user capacity being large is prioritized over performance of a write process being high. "Performance prioritized" means that the performance of a write process being high is prioritized over the user capacity being large. At least one of the performances A and B is higher when capacity prioritized is adopted as compared to when performance prioritized is adopted. Therefore, even when the asynchronous processing performance is the same, the result of an extensibility/reducibility determination may differ depending on the policy. For example, when the asynchronous processing performance is 30 KIOPS, in performance prioritized, reducible is obtained (in other words, reducing the asynchronous processing performance prioritizes improving the write processing performance), and in capacity prioritized, extensible is obtained (in other words, the user capacity being large is prioritized even when the asynchronous processing performance is improved).

Figure 7:
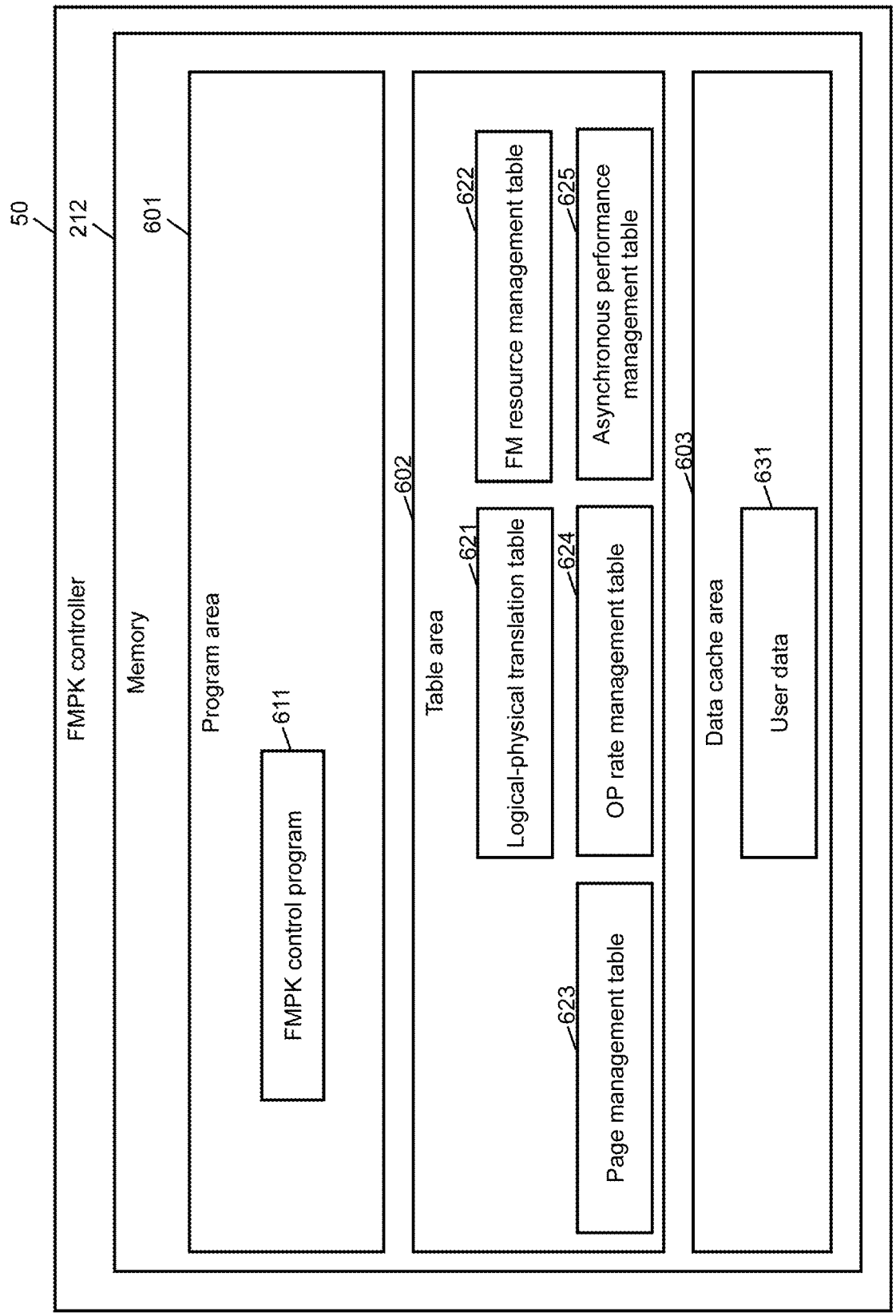
FIG. 7 shows a configuration of a memory of an FMPK controller.

FIG. 7 shows a configuration of the memory 212 of the FMPK controller 50.

The memory 212 has a program area 601, a table area 602, and a data cache area 603.

The program area 601 stores a program such as an FMPK control program 611 which controls operations of the FMPK controller 50. The program is executed by the processor 214. For example, in response to a write command from the storage controller 111, the FMPK control program 611 specifies a physical page that is a write destination based on a logical-physical translation table 621 and writes data to the FM chip 202 having the specified write destination physical page. In addition, for example, in response to a read command from the storage controller 111, the FMPK control program 611 specifies a physical page that is a read source based on the logical-physical translation table 621 and reads data from the FM chip 202 having the specified read source physical page.

The table area 602 stores table such as the logical-physical translation table 621, an FM resource management table 622, a page management table 623, an OP rate management table 624, and an asynchronous performance management table 625. The tables will be described in detail later.

The data cache area 603 temporarily stores user data 631. The user data 631 is data (data that is a write target or a read target) in accordance with an I/O command from the storage controller 111.

FIG. 8 shows a configuration of the tables stored in the table area 602 of the FMPK controller 50. In the description of FIG. 8, the FMPK 131 having the table area 602 shown in FIG. 8 will be referred to as a "target FMPK 131".

The OP rate management table 624 holds information related to the OP rate of the target FMPK 131 or, more specifically, an OP rate 701 and a user capacity 702. The OP rate 701 indicates a determined OP rate. The user capacity 702 indicates a user capacity of the target FMPK 131. The user capacity 702 is calculated based on a physical capacity and the OP rate of the target FMPK 131.

The FM resource management table 622 holds information related to an FM resource usage rate of the target FMPK 131. The FM resource management table 622 has an entry for each period. Each entry holds information such as an ID 721, a time point 722, the memory 723, a CPU 724, a bus bandwidth 725, a cache usage rate 726, and the cache bandwidth 727. The ID 721 is an ID of a period. The time point 722 represents a start time point of the period. The memory 723 indicates a memory usage rate (a usage rate of the memory 212) specified in the period. The CPU 724 indicates a processor usage rate (a usage rate of the processor 214) specified in the period. The bus bandwidth 725 indicates a bus bandwidth (a bandwidth of the FM bus 59) specified in the period. The cache usage rate 726 indicates a cache usage rate (a usage rate of the data cache region 403) specified in the period. The cache bandwidth 727 indicates a cache bandwidth (a bandwidth of the cache bus 58) specified in the period. The period is a certain period (for example, 30 minutes). Each of the memory 723 to the cache bandwidth 727 is an example of an FM resource usage rate. When an FM resource usage rate of a same type is specified a plurality of times during a same period, a value to be registered in the table 622 is a value in accordance with at least one of the specified FM resource usage rates such as an average value or a highest (worst) FM resource usage rate. In addition, one type of the FM resource usage rate may be registered in the table 624.

The asynchronous performance management table 625 holds information related to performance of an asynchronous process (for example, the number of I/Os per unit time or a data transfer size per unit time) of the target FMPK 131. The asynchronous performance management table 625 has an entry for each period. Each entry holds information such as an ID 711, a time point 712, reclamation 713, and refresh 714. The ID 711 is an ID of a period. The time point 712 represents a start time point of the period. The reclamation 713 indicates a reclamation processing performance specified in the period. The refresh 714 indicates a performance of a refresh process specified in the period. A reclamation process and a refresh process are examples of the asynchronous process. When an asynchronous processing performance of a same type is specified a plurality of times during a same period, a value to be registered in the table 625 is a value in accordance with at least one of the specified asynchronous processing performances such as an average value, a lowest (worst) performance, or a highest (best) performance.

In this case, the "asynchronous process" refers to a process performed by the FMPK 131 asynchronously with a write process that is performed by the FMPK 131 in response to a write command having data such as update data as a write target and, typically, the asynchronous process generates write of data with respect to the FM 220 such as a reclamation process and a refresh process.

A "reclamation process" refers to a process of reading valid data from each of one or more physical blocks, migrating the read data to a physical block (for example, a physical block with a smaller number of erases than a physical block that is a migration source), and executing an erase process with respect to the migration source physical block. Due to a reclamation process, empty physical blocks can be increased.

In addition, a "refresh process" refers to a process of reading data (particularly, valid data) from a physical block, performing error correction on the data, and migrating the error-corrected data to a different physical block (for example, a physical block with a smaller number of PEs than a physical block that is a migration source). Due to a refresh process, a migration destination physical block is allocated in place of a migration source physical block to a logical region (for example, a logical block) to which the migration source physical block had been allocated.

The logical-physical translation table 621 holds information related to a correspondence between a logical address and a physical address. The logical-physical translation table 621 has an entry for each logical page (an example of the logical area). Each entry holds information such as a logical page number 731, an LBA 732, a logical page size 733, a status 734, a physical page number 735, and a block number 736. The logical page number 731 is an identification number of a logical page. The LBA 732 indicates a head LBA of the logical page. The logical page size 733 indicates a size of the logical page. The status 734 indicates a status of the logical page. Examples of the status 734 include "valid" (a logical page being based on a user area and being allocated as a part of a pool), "invalid" (a logical page being based on a user area but not being allocated as a part of a pool), and "unusable" (a logical page being based on an update area). The physical page number 735 is an identification number of a physical page allocated to the logical page. The block number 736 is an identification number of a physical block that includes a physical page allocated to the logical page.

The page management table 623 holds information related to physical pages. The page management table 623 has an entry for each physical page. Each entry holds information such as a physical page number 741 and a status 742. The physical page number 741 is an identification number of a physical page. The status 742 indicates a status of the physical page.

Hereinafter, processes performed in the present embodiment will be described.

Figure 9:
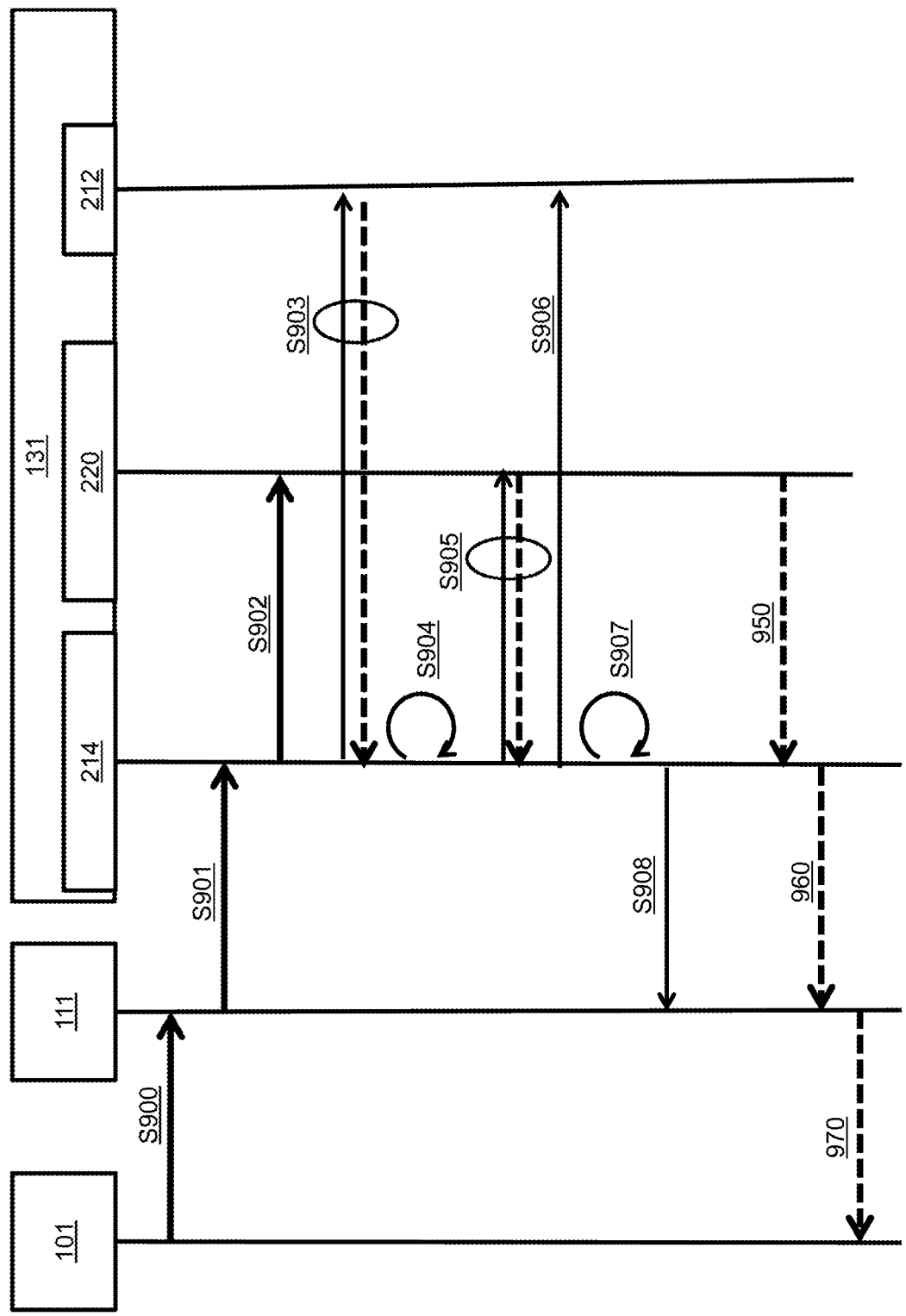
FIG. 9 is a sequence diagram of a process performed in response to a write request.
Figure 10:
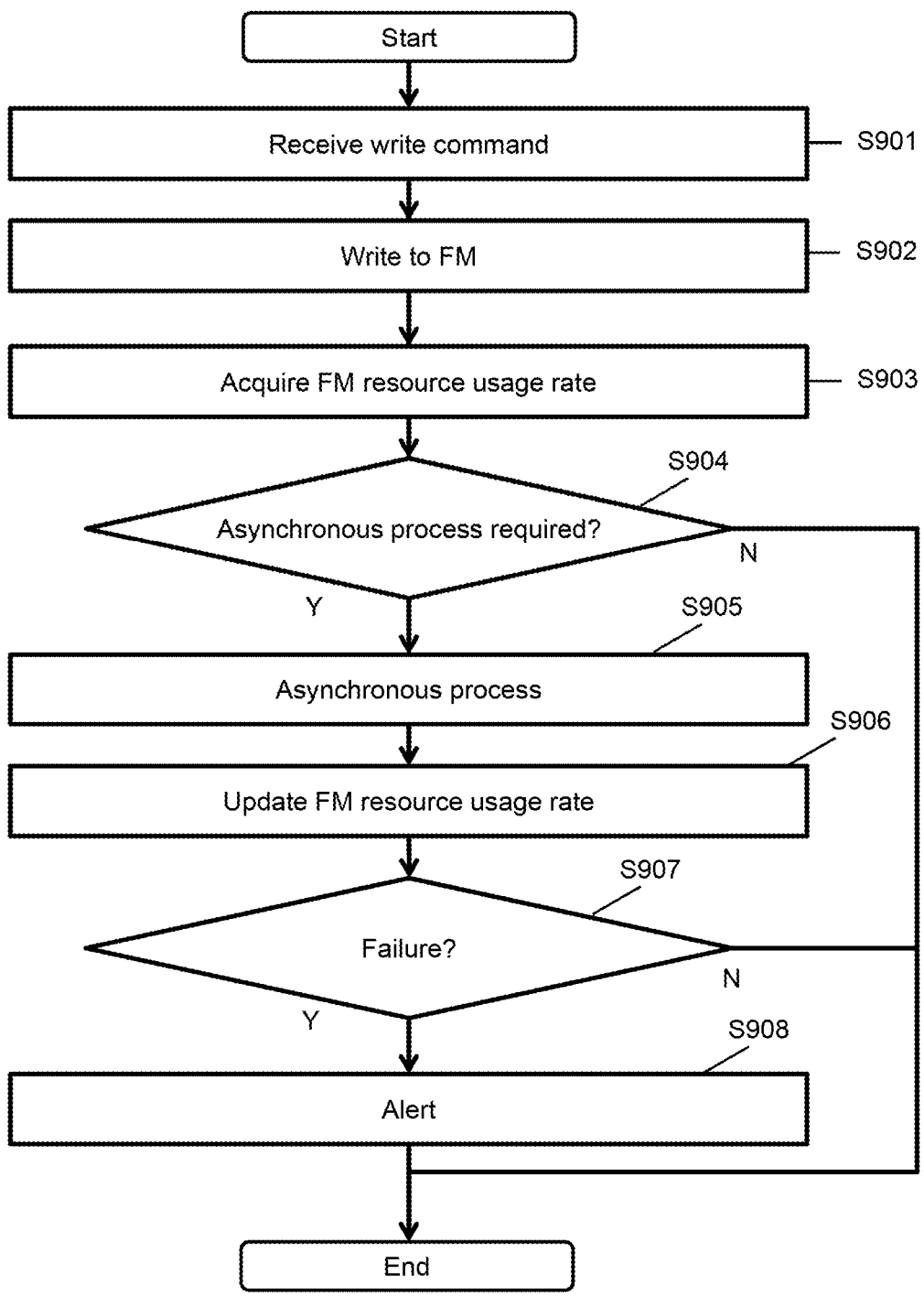
FIG. 10 is a flow chart of a process performed by an FMPK that receives a write command.

FIG. 9 shows a flow of processes performed in response to a write request. FIG. 10 shows a flow of processes performed by the FMPK 131 that receives a write command.

The storage controller 111 receives a write request from the host computer 101 (S900). Based on the write request, the storage controller 111 (the storage control program 411) transmits a write command to at least one FMPK 131 in the PG 810. Hereinafter, one FMPK 131 will be used as an example in the description of FIGS. 9 and 10. In the description of FIGS. 9 and 10, the FMPK 131 will be referred to as a "target FMPK 131".

The FMPK controller 50 (the processor 214) of the target FMPK 131 receives the write command (S901). Based on the write command, the processor 214 (the FMPK control program 611) writes data of a write target in accordance with the write command into the FM 220 (S902).

The FMPK control program 611 acquires FM resource usage rates of a plurality of types (the memory 723 to the cache bandwidth 727) of the target FMPK 131 from the FM resource management table 622 (S903). It should be noted that the FM resource usage rates of a plurality of types may be respectively periodically measured and registered in the FM resource management table 622 or may be measured in present S903.

The FMPK control program 611 determines whether or not an asynchronous process is required (S904). With respect to a process performed in response to a write command, the asynchronous process is typically a reclamation process. For example, when the number of empty blocks relative to a total number of physical blocks is smaller than a threshold (in other words, when there is only a small number of empty blocks), it is determined that a reclamation process is required.

When the determination result of S904 is true (S904: Y), the FMPK control program 611 executes the asynchronous process (S905). In addition, the FMPK control program 611 registers a changed FM resource usage rate in accordance with the asynchronous process to the FM resource management table 622 (S906).

The FMPK control program 611 determines whether or not a failure has occurred in the target FMPK 131 (S907). A "failure" as used herein refers to: a free capacity in the user capacity of the target FMPK 131 falling below a prescribed capacity (for example, a ratio of the number of "invalid" logical pages relative to the total number of logical pages constituting the user area 801U falling below a prescribed value); or the performance of a write process of the target FMPK 131 falling below a prescribed performance.

When the determination result of S907 is true (S907: Y), the FMPK control program 611 issues an alert (S908).

The processes performed in response to a write request are as described above. In the processes, a response 950 is returned with respect to a write to the FM 220, a response 960 is returned with respect to a write command, and a response 970 is returned with respect to a write request.

Each FMPK 131 may periodically determine whether or not an asynchronous process is required. For example, the storage controller 111 may periodically transmit a periodic processing command to the FMPK 131.

Figure 11:
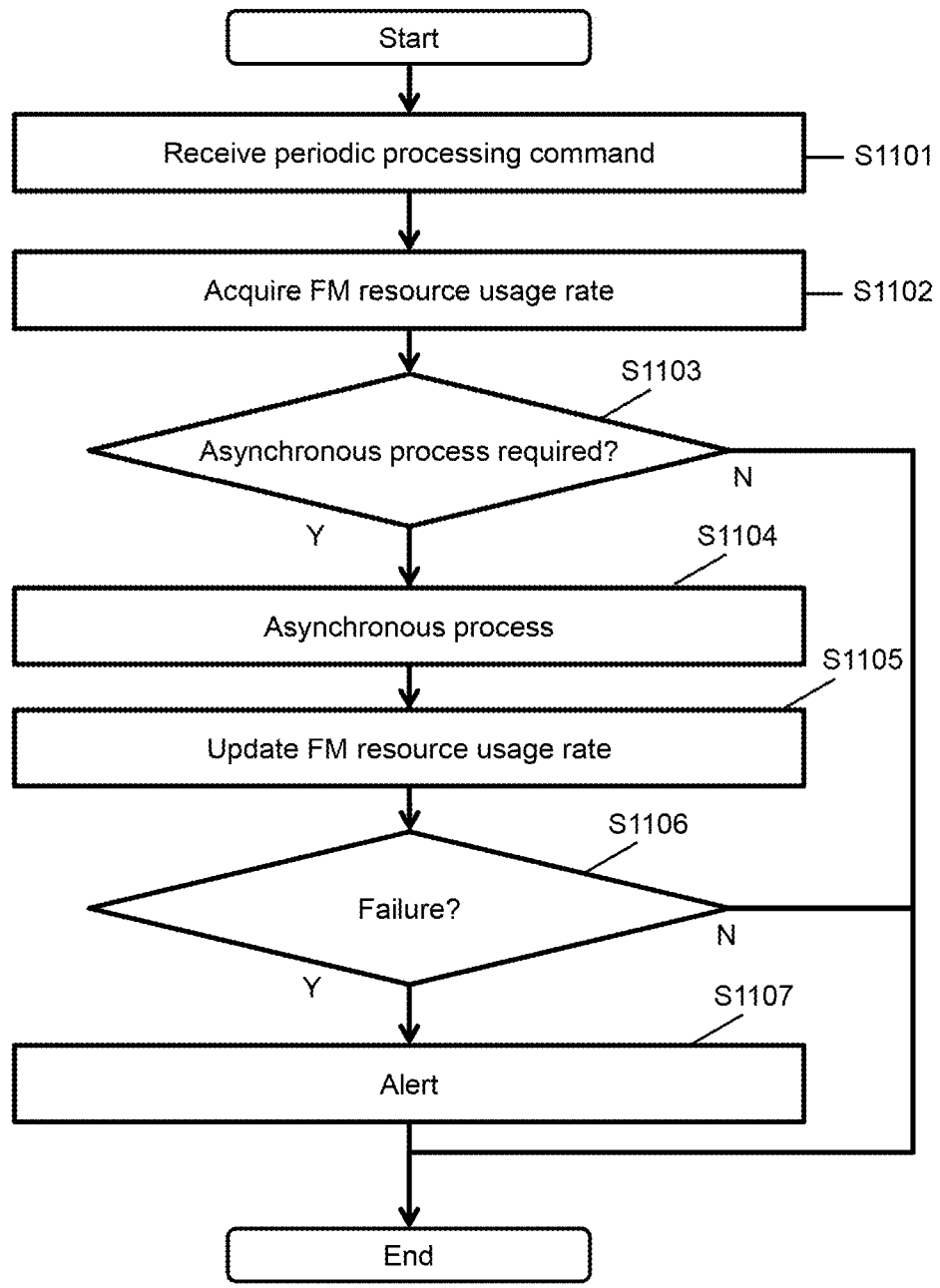
FIG. 11 is a flow chart of a process performed by an FMPK that receives a periodic processing command.

FIG. 11 shows a flow of processes performed by the FMPK 131 that receives a periodic processing command. In the description of FIG. 11, the FMPK 131 will be referred to as a "target FMPK 131".

The FMPK controller 50 (the processor 214) receives the periodic processing command (S1101).

The processor 214 (the FMPK control program 611) acquires FM resource usage rates of a plurality of types (the memory 723 to the cache bandwidth 727) of the target FMPK 131 from the FM resource management table 622 (S1102).

The FMPK control program 611 determines whether or not an asynchronous process is required (S1103). The asynchronous process at this point is not limited to a reclamation process.

When the determination result of S1103 is true (S1103: Y), the FMPK control program 611 executes the asynchronous process (S1104). In addition, the FMPK control program 611 registers a changed FM resource usage rate in accordance with the asynchronous process to the FM resource management table 622 (S1105).

The FMPK control program 611 determines whether or not the failure described above has occurred in the target FMPK 131 (S1106).

When the determination result of S1106 is true (S1106: Y), the FMPK control program 611 issues an alert (S1107).

Figure 12:
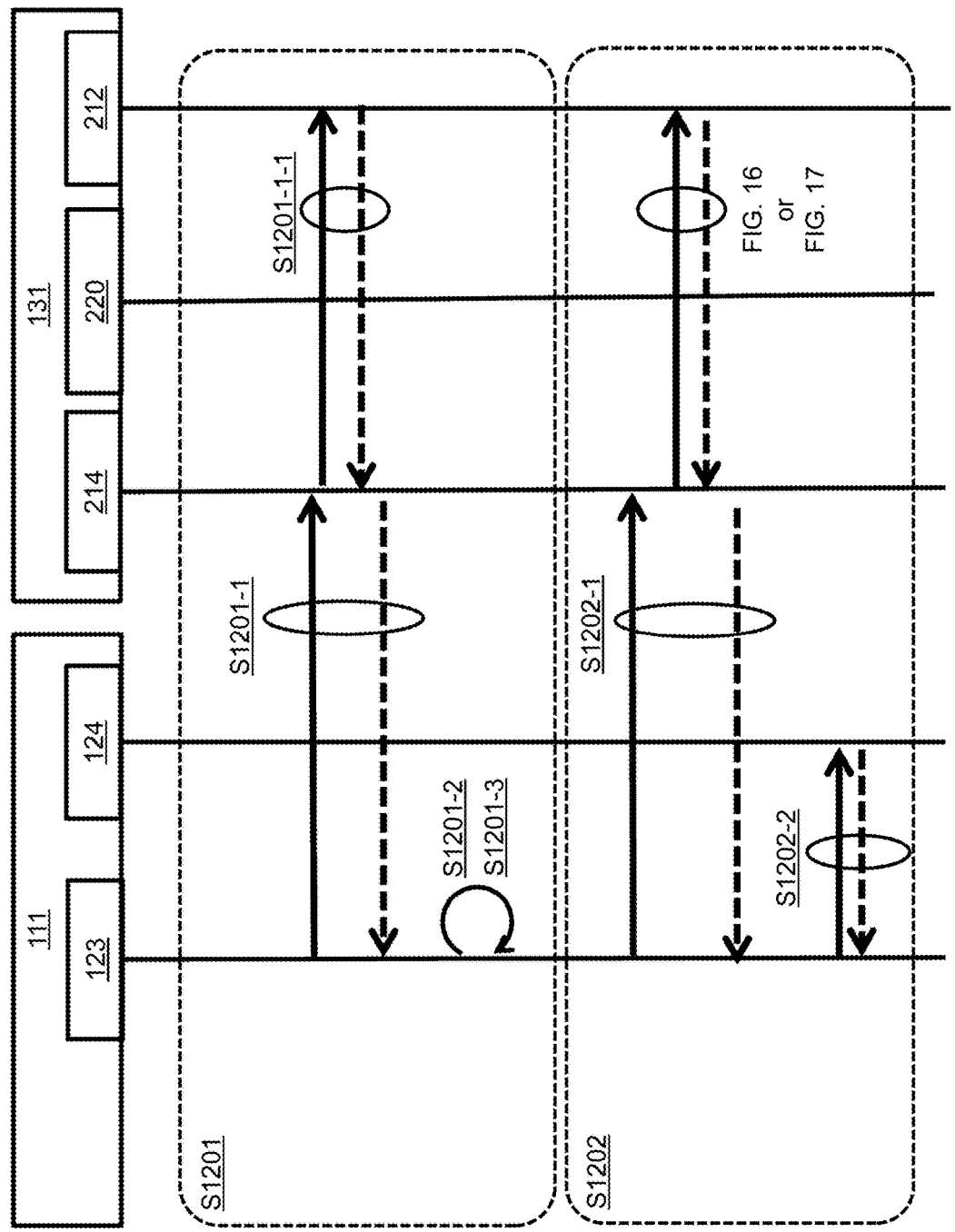
FIG. 12 is a sequence diagram of a process performed in response to a storage controller receiving an alert.
Figure 13:
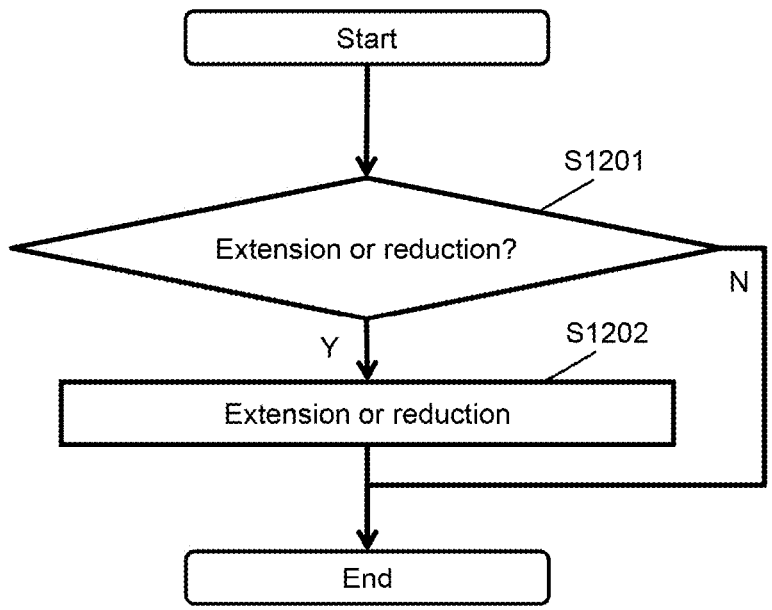
FIG. 13 is a flow chart of a process including an extensibility/reducibility determination.

FIG. 12 shows a flow of processes performed in response to the storage controller 111 receiving an alert. FIG. 13 shows a flow of processes including an extensibility/reducibility determination. Since an extension or a reduction of the user capacity is triggered by an occurrence of an alert due to user capacity depletion or a decline in performance, optimizing the user capacity is conducive to eliminating a cause of the alert.

When the processor 123 (the storage control program 411) receives an alert from the FMPK 131, the processor 123 specifies the PG 810 including the FMPK 131 based on the PG management table 424 and executes, with respect to the specified PG 810, an extensibility/reducibility determination that is a determination of whether or not an extension or a reduction of the user capacity is to be executed (S1201).

When the determination result of S1201 is true (S1201: Y), the storage control program 411 executes an extension or a reduction of the user capacity with respect to the specified PG 810 (S1202).

Figure 14:
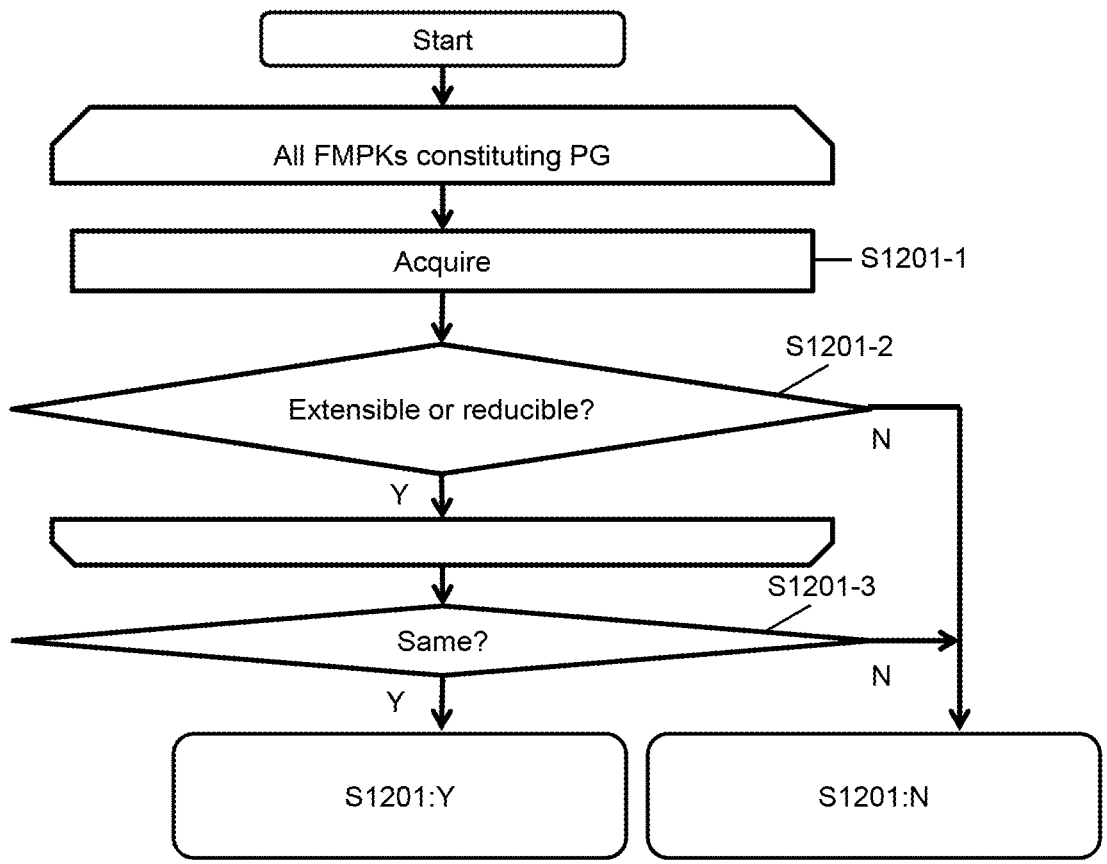
FIG. 14 is a flow chart showing details of an extensibility/reducibility determination.

Hereinafter, details of the extensibility/reducibility determination will be described with reference to FIGS. 12 and 14. It should be noted that, hereinafter, the PG 810 including the FMPK 131 that is an issuance source of the alert will be referred to as a "target PG 810".

The storage control program 411 selects any FMPK 131 for which S1201-1 and S1201-2 have not yet been performed in the target PG 810. The FMPK 131 selected at this point will be referred to as a "selected FMPK 131".

The storage control program 411 specifies an FM resource usage rate and an asynchronous processing performance from the selected FMPK 131 (S1201-1). Specifically, the storage control program 411 transmits an acquisition command to the selected FMPK 131. In response to the acquisition command, the processor 214 (the FMPK control program 611) of the selected FMPK 131 acquires FM resource usage rates of a plurality of types (the memory 723 to the cache bandwidth 727) from the FM resource management table 622 and, acquires a latest asynchronous processing performance (the reclamation 713 and the refresh 714) from the asynchronous performance management table 625 (S1201-1-1), and returns a response including the acquired FM resource usage rates and the asynchronous processing performance (a response to the acquisition command) to the storage controller 111.

The storage control program 411 specifies a result corresponding to a highest FM resource usage rate and a highest asynchronous processing performance of the selected FMPK 131 from the extensibility/reducibility determination table 426 (S1201-2).

When the result is "not possible", the storage control program 411 adopts false as the determination result of S1201 with respect to the target PG 810 (S1201: N).

When the result is "extensible" or "reducible", if there is an FMPK 131 for which S1201-1 and S1201-2 have not yet been performed in the target PG 810, the storage control program 411 executes S1201-1 and S1201-2 with respect to the FMPK 131.

When the result is "extensible" or "reducible", if there is no FMPK 131 for which S1201-1 and S1201-2 have not yet been performed in the target PG 810, the storage control program 411 determines whether or not a same result has been obtained for all FMPKs 131 of the target PG 810 (in other words, whether or not all of the results are "extensible" or all of the results are "reducible") (S1201-3). When the determination result of S1201-3 is true (S1201-3: Y), the determination result of S1201 is true (S1201: Y). When the determination result of S1201-3 is false (S1201-3: N), the determination result of S1201 is false (S1201: N). Accordingly, an extension or a reduction in PG units can be performed with respect to the target PG 810. Alternatively, the storage control program 411 may adopt S1201: N as the determination result of S1201 as soon as a different result is obtained with respect to the target PG 810.

Figure 15:
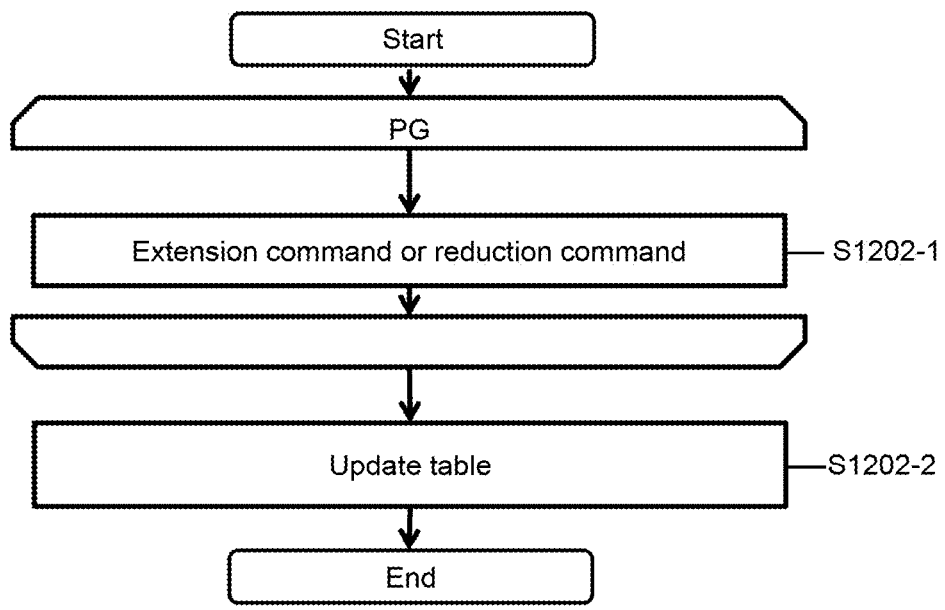
FIG. 15 is a flow chart showing details of a process performed by a storage controller with respect to S1202.

Hereinafter, details of processes performed by the storage controller 111 with respect to S1202 will be described with reference to FIGS. 12 and 15.

S1202-1 is executed with respect to each FMPK 131 constituting the target PG 810. Specifically, when the determination result of S1201 is "extensible", the storage control program 411 transmits an extension command to each FMPK 131 constituting the target PG 810. On the other hand, when the determination result of S1201 is "reducible", the storage control program 411 transmits a reduction command to each FMPK 131 constituting the target PG 810.

Subsequently, S1202-2 is executed. Specifically, with respect to the target PG 810, the storage control program 411 registers a changed OP rate in accordance with an extension command or a reduction command to the PG management table 424 as the OP rate 526. In the present embodiment, an amount of change in an OP rate in accordance with an extension command and an amount of change in an OP rate in accordance with a reduction command are constant. However, the amount of change in the OP rate in accordance with an extension command and the amount of change in the OP rate in accordance with a reduction command may be the same or may differ from one another.

It should be noted that an amount of change in a user capacity may be constant instead of the amount of change in the OP rate. In addition, with respect to the amount of change in the user capacity, an amount of change when performing an extension and an amount of change when performing a reduction may be the same or may differ from one another.

In addition, for example, S1201 may be executed periodically instead of when an alert occurs from any of the FMPKs 131.

As described above, an extensibility/reducibility determination is executed either every time an alert occurs or periodically and, in accordance with the determination result, an OP rate is changed in PG units. In other words, an OP rate change based on an FM resource usage rate and an asynchronous processing performance is to be repeated during an operation of the storage system 104. As a result, it is expected that an optimal OP rate may be maintained during the operation of the storage system 104.

Figure 16:
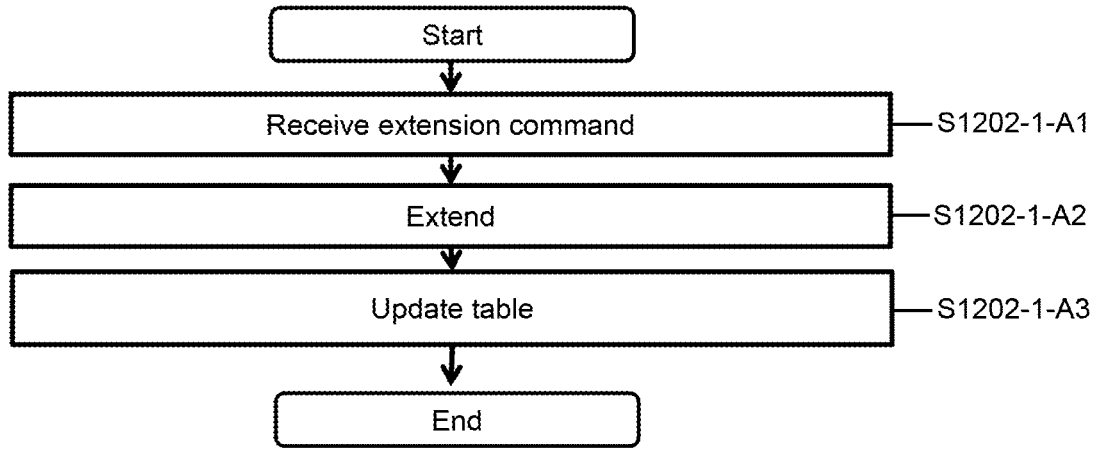
FIG. 16 is a flow chart of a process performed by an FMPK with respect to extension.

FIG. 16 shows a flow of processes performed by the FMPK 131 with respect to an extension.

The FMPK 131 (the FMPK control program 611) receives the extension command (S1201-1-A1) and extends the user capacity (S1201-1-A2). Specifically, for example, the FMPK control program 611 secures a free area (one or more empty blocks (blocks as sets of empty pages)) corresponding to an amount of change in an OP rate from the update area. When a free area corresponding to the amount of change in the OP rate is not available, empty blocks may be increased by a reclamation process.

Subsequently, the FMPK control program 611 changes the status 734 of each of the logical pages corresponding to the amount of change in the OP rate from "unusable" to "invalid" and, changes the OP rate 701 to the OP rate after the extension (S1201-1-A3). The FMPK control program 611 returns a completion response with respect to the extension command to the storage controller 111.

Figure 17:
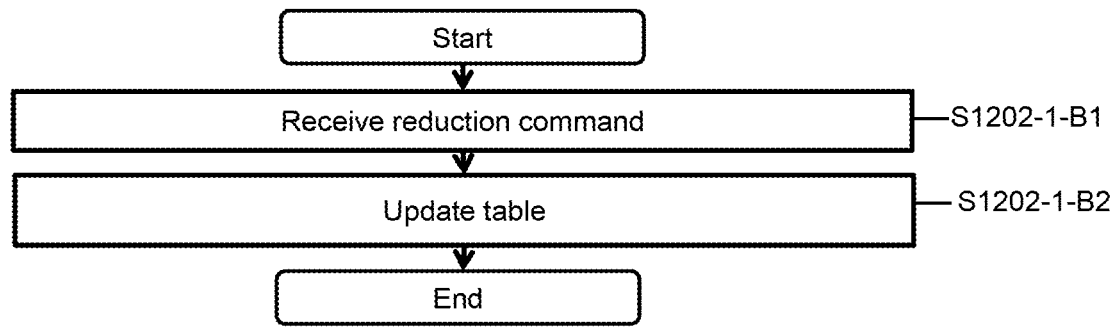
FIG. 17 is a flow chart of a process performed by an FMPK with respect to reduction.

FIG. 17 shows a flow of processes performed by the FMPK 131 with respect to a reduction.

The FMPK 131 (the FMPK control program 611) receives the reduction command (S1201-1-B1), changes the status 734 of each of the logical pages corresponding to the amount of change in the OP rate from "invalid" to "unusable", and changes the OP rate 701 to the OP rate after the reduction (S1201-1-B2). The FMPK control program 611 returns a completion response with respect to the reduction command to the storage controller 111. Since a reduction is possible because there is a free area in the user area, there is no need to secure a free area corresponding to the amount of change in the OP rate from the user area.

This concludes the description of the first embodiment.

Figure 20:
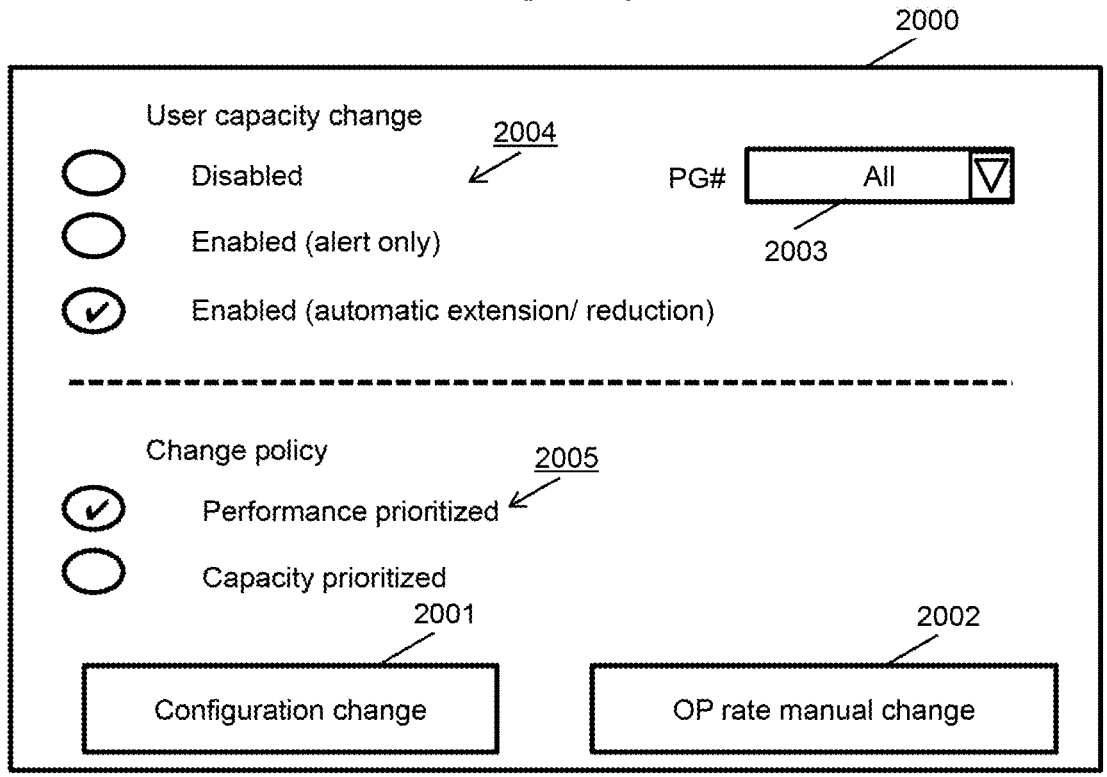
FIG. 20 shows an example of a configuration screen.

In the present embodiment, various configurations may be performed via a configuration screen 2000 (for example, a GUI (Graphical User Interface)) exemplified in FIG. 20. The screen 2000 may be displayed on, for example, the management computer 102. For example, the screen 2000 has a PG designating UI (user interface) 2003, a user capacity change configuration UI 2004, a policy configuration UI 2005, a configuration change button 2001, and an OP rate manual change button 2002. The PG designating UI 2003 enables a PG with which a configuration is associated to be designated. The user capacity change configuration UI 2004 enables whether or not a change in the user capacity (a change in the OP rate) is to be made and whether the change is to be made automatically or manually to be designated. The policy configuration UI 2005 enables which of performance prioritized and capacity prioritized is to be adopted to be designated. When the configuration change button 2001 is pressed, a designation (configuration) via the UIs 2003, 2004, and 2005 is reflected to the table 424 (the table 424 may be provided with a column representing whether or not an OP rate change is enabled (whether automatic or manual)). When the OP rate manual change button 2002 is pressed, the OP rate is changed manually.

Figure 21:
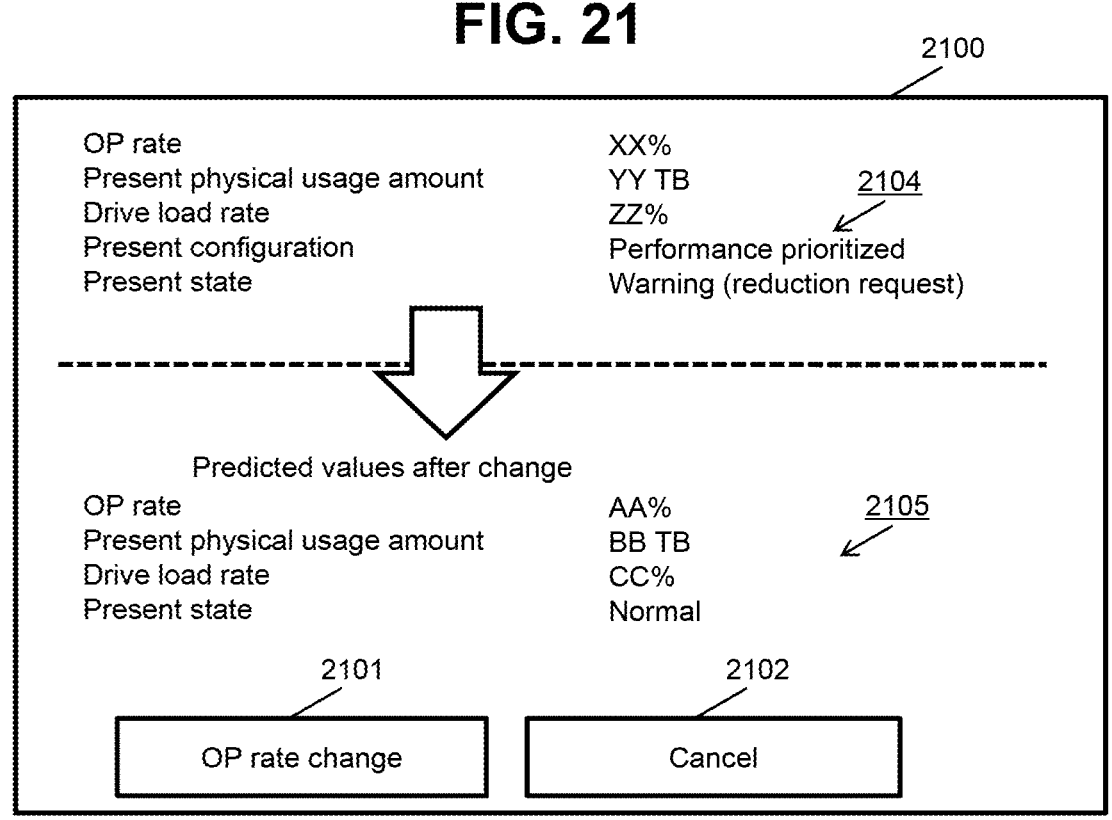
FIG. 21 shows an example of a prediction screen.

In addition, in the present embodiment, a prediction screen 2100 (for example, a GUI) exemplified in FIG. 21 may be displayed by, for example, the storage control program 411. For example, with respect to an FMPK 131 that is an alert issuance source, the storage control program 411 may display, on the screen 2100, a present situation 2014 including a highest FM resource usage rate (including a type of the FM resource usage rate) and an OP rate (a user capacity) and a predicted situation 2015 including an FM resource usage rate and an OP rate (a user capacity) when assuming that the OP rate is changed (extended or reduced). The screen 2100 has an OP rate change button 2101 and a cancel button 2102. When the OP rate change button 2101 is pressed, the storage control program 411 may execute an OP rate change with respect to the PG 810 including the FMPK 131 that is the alert issuance source. Accordingly, a determination to change the OP rate can be made after checking a predicted situation after an OP rate change. Meanwhile, when the cancel button 2102 is pressed, the storage control program 411 may skip an OP rate change with respect to the PG 810 including the FMPK 131 that is the alert issuance source.

In addition, in the present embodiment, while the user capacity changes during an operation of the storage system 104, the change in the user capacity is not visible from the host computer 101. This is because a volume provided to the host computer 101 is a virtual volume and, while a capacity of a pool changes, a capacity of the virtual volume itself does not change.

Example 2

A second embodiment will now be described. In doing so, differences from the first embodiment will be mainly described and descriptions of points in common with the first embodiment will be either omitted or simplified.

In the present embodiment, an amount of change in the user capacity is variable. For example, any of the storage control program. 411 and the FMPK control program 611 determines an amount of change in the user capacity based on an FM resource usage rate and an asynchronous processing performance. Specifically, for example, for each FMPK 131, any of the storage control program 411 and the FMPK control program 611 determines a maximum amount of change in the user capacity based on a highest FM resource usage rate and a highest asynchronous processing performance of the FMPK 131. With respect to the PG 810, the storage control program 411 determines a maximum amount of change based on a plurality of maximum amounts of change (for example, a minimum value among a plurality of maximum amounts of change) respectively corresponding to the plurality of FMPKs 131 constituting the PG 810. The storage control program 411 determines an amount of change obtained by subtracting a prescribed margin from the determined maximum amount of change as the amount of change in the user capacity.

According to the second embodiment, the amount of change in the user capacity is not a fixed value but is based on a maximum amount of change in accordance with an FM resource usage rate and an asynchronous processing performance. As a result, it is expected that a time until the OP rate is set to an optimal value may be shortened.

In addition, according to the second embodiment, the amount of change in the user capacity is an amount obtained by subtracting a prescribed margin from the maximum amount of change. As a result, the possibility of the performance of the storage system 104 being adversely affected can be reduced.

Figure 22:
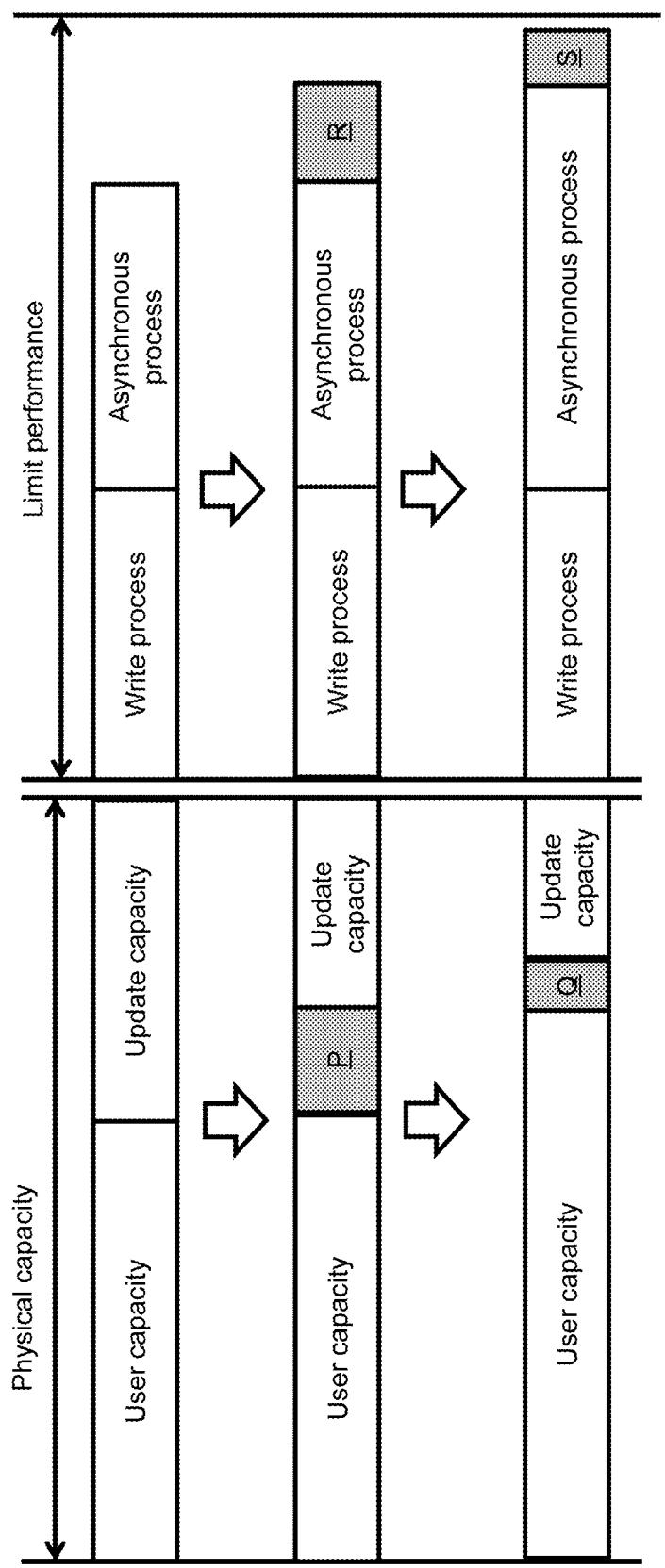
FIG. 22 shows an example of a relationship between user capacity transitions and performance transitions according to a second embodiment.

Hereinafter, an example of the second embodiment will be described with reference to FIG. 22 using an extension as an example. A left side of FIG. 22 shows user capacity transitions and a right side of FIG. 22 shows performance transitions that accompany the user capacity transitions.

When the asynchronous processing performance is low and the FM resource usage rate is also low, there is a sufficient difference between a sum of a write processing performance and the asynchronous processing performance and a limit performance of an FMPK. In this case, a maximum extension amount in accordance with the FM resource usage rate and the asynchronous processing performance is relatively large. The storage control program 411 (or the FMPK control program 611) determines an amount P obtained by subtracting a prescribed margin from the maximum extension amount as an extension amount. When the user capacity is extended by the extension amount P, since the update capacity decreases by the extension amount P, an occurrence frequency of the asynchronous process increases and, as a result, the asynchronous processing performance increases by a performance R.

When the asynchronous processing performance increases and the FM resource usage rate rises, the storage control program 411 (or the FMPK control program 611) determines, as a maximum extension amount in accordance with the FM resource usage rate and the asynchronous processing performance, a smaller amount than the maximum extension amount in a case where the asynchronous processing performance is low and the FM resource usage rate is also low. In addition, the storage control program 411 determines an amount Q obtained by subtracting a prescribed margin from the determined maximum extension amount as an extension amount (the margin may have a fixed size or may be variable in a similar manner to the maximum extension amount). When the user capacity is further extended by the extension amount Q, since the update capacity decreases by the extension amount Q, an occurrence frequency of the asynchronous process further increases and, as a result, the asynchronous processing performance further increases by a performance S.

Although the user capacity can be extended as much as possible while avoiding a decline in the write processing performance in this manner, when an amount of change in the user capacity is made to be a variable amount in accordance with the FM resource usage rate and the asynchronous processing performance, it is expected that an attainment of an optimal user capacity (an attainment of an optimal OP rate) can be realized in a shorter time than in the first embodiment.

While several embodiments have been described above, it is to be understood that the described embodiments merely represent examples for illustrating the present invention and that the scope of the present invention is not limited to the embodiments. The present invention can also be implemented in various other modes. For example, in a storage system that does not adopt a PG, an FMPK may execute an extensibility/reducibility determination. For example, the FMPK control program may internally issue an alert (an issuance destination of the alert is the FMPK control program) and, upon receiving the alert, execute an extensibility/reducibility determination. In addition, the FMPK control program of the FMPK can change the user capacity to a user capacity in accordance with a determination based on at least one of one or more resource usage rates of the FMPK. "Change the user capacity to a user capacity in accordance with a determination based on at least one of one or more resource usage rates of the FMPK" may be performed in response to a change command from a higher-level system of the FMPK or may involve the FMPK control program changing the user capacity based on at least one of one or more resource usage rates of the FMPK.

REFERENCE SIGNS LIST

104 Storage system

The invention claimed is:

1. A storage system, comprising:
one or more non-volatile memory devices, each non-volatile memory device having a non-volatile memory and a plurality of resources including resources of a plurality of types; and
one or more processors connected to the one or more non-volatile memory devices,
wherein in each of the one or more non-volatile memory devices, at least a part of the non-volatile memory is constituted by a user area that is a storage area into which data is to be written and an update area that is a storage area into which update data for the data is to be written,
wherein the one or more processors is configured to change, based on at least one of one or more resource usage rates of the one or more non-volatile memory devices, a user capacity that is a capacity of the user area in each of the one or more non-volatile memory devices,
wherein with respect to each of the one or more non-volatile memory devices, a change in a user capacity is further based on an asynchronous processing performance with respect to each of the one or more non-volatile memory devices,
wherein with respect to at least one of the one or more non-volatile memory devices, any of the non-volatile memory device and the one or more processors is configured to execute an extensibility/reducibility determination that is a determination of a user capacity of the non-volatile memory device being any of extensible, reducible, and unchangeable based on a resource usage rate of the non-volatile memory device and an asynchronous processing performance of the non-volatile memory device, wherein each of the one or more non-volatile memory devices is configured to execute:

a write process that is a process of writing, in response to a write command, write target data in accordance with the write command into the non-volatile memory of the non-volatile memory device; and an asynchronous process that is a process performed asynchronously with the write process, wherein with respect to each of the one or more non-volatile memory devices, a change in a user capacity is based on a result of the extensibility/reducibility determination with respect to at least one of the one or more non-volatile memory devices, and wherein with respect to at least one of the one or more non-volatile memory devices, when the resource usage rate of the non-volatile memory device is lower than a first usage rate and the asynchronous processing performance of the non-volatile memory device is lower than a first processing performance, the result of the extensibility/reducibility determination is extensible, and when the resource usage rate of the non-volatile memory device is equal to or higher than a second usage rate and the asynchronous processing performance of the non-volatile memory device is equal to or higher than a second processing performance, the result of the extensibility/reducibility determination is reducible, the second usage rate being equal to or higher than the first usage rate, and the second processing performance being equal to or higher than the first processing performance.

2. The storage system according to claim 1, wherein with respect to at least one of the one or more non-volatile memory devices, each of the first and second processing performances is higher when a policy of capacity prioritized which prioritizes the user capacity being large over the performance of the write process being high is adopted than when a policy of performance prioritized which prioritizes the performance of the write process being high over the user capacity being large is adopted.

3. The storage system according to claim 1, wherein the one or more non-volatile memory devices are a plurality of non-volatile memory devices constituting a parity group, and with respect to each of the plurality of non-volatile memory devices, a change in the user capacity is executed when results of the extensibility/reducibility determination for the plurality of non-volatile memory devices are the same.

4. The storage system according to claim 1, wherein with respect to at least one of the one or more non-volatile memory devices, when a free capacity in a user capacity of the non-volatile memory device falls below a prescribed capacity or a performance of a write process of the non-volatile memory device falls below a prescribed performance, any of the non-volatile memory device and the one or more processors is configured to execute the extensibility/reducibility determination.

5. The storage system according to claim 1, wherein with respect to each of the one or more non-volatile memory devices, a resource usage rate to which is referred in order to change a user capacity is a highest resource usage rate among a plurality of resource usage rates of the non-volatile memory device.

6. The storage system according to claim 1, wherein with respect to each of the one or more non-volatile memory devices, an amount of change with respect to a user capacity is constant.

7. The storage system according to claim 1, wherein with respect to each of the one or more non-volatile memory devices, an amount of change with respect to a user capacity is an amount obtained by subtracting a prescribed amount of margin from a maximum amount of change in accordance with a resource usage rate and an asynchronous processing performance.

8. The storage system according to claim 1, wherein with respect to each of the one or more non-volatile memory devices, a change in a user capacity is a change in an OP (Over Provisioning) rate, and with respect to each of the one or more non-volatile memory devices, the OP rate is a value which is determined based on at least two of (a), (b), and (c) described below, and when the user capacity becomes larger, the value becomes smaller:

(a) a user capacity;
(b) an update capacity that is a capacity of an update area; and
(c) a physical capacity that is a capacity of a storage area constituted by the user area and the update area.

9. The storage system according to claim 1, wherein the one or more processors is configured to execute, with respect to at least one of the one or more non-volatile memory devices, display of information representing a present situation including a resource usage rate and a user capacity and a predicted situation including a resource usage rate and a user capacity when assuming that the user capacity is changed, and the one or more processors is configured to change the user capacity with respect to each of the one or more non-volatile memory devices when receiving an instruction to make a change with respect to the display.

10. A storage control method, comprising:

acquiring one or more resource usage rates of one or more non-volatile memory devices, each non-volatile memory device having a non-volatile memory and a plurality of resources including resources of a plurality of types, providing one or more processors connected to the one or more non-volatile memory devices, wherein in each of the one or more non-volatile memory devices, at least a part of the non-volatile memory being constituted by a user region that is a storage area into which data is to be written and an update area that is a storage area into which update data for the data is to be written; and changing, based on at least one of the acquired one or more resource usage rates, a user capacity that is a capacity of the user area with respect to each of the one or more non-volatile memory devices, wherein with respect to each of the one or more non-volatile memory devices, a change in a user capacity is further based on an asynchronous processing performance with respect to each of the one or more non-volatile memory devices, and wherein with respect to at least one of the one or more non-volatile memory devices, any of the non-volatile memory device and the one or more processors is configured to execute an extensibility/reducibility determination that is a determination of a user capacity of the non-volatile memory device being any of extensible, reducible, and unchangeable based on a resource usage rate of the non-volatile memory device and an asynchronous processing performance of the non-volatile memory device, wherein each of the one or more non-volatile memory devices is configured to execute:
  a write process that is a process of writing, in response to a write command, write target data in accordance with the write command into the non-volatile memory of the non-volatile memory device; and
  an asynchronous process that is a process performed asynchronously with the write process, wherein with respect to each of the one or more non-volatile memory devices, a change in a user capacity is based on a result of the extensibility/reducibility determination with respect to at least one of the one or more non-volatile memory devices, and wherein with respect to at least one of the one or more non-volatile memory devices,
  when the resource usage rate of the non-volatile memory device is lower than a first usage rate and the asynchronous processing performance of the non-volatile memory device is lower than a first processing performance, the result of the extensibility/reducibility determination is extensible, and
  when the resource usage rate of the non-volatile memory device is equal to or higher than a second usage rate and the asynchronous processing performance of the non-volatile memory device is equal to or higher than a second processing performance, the result of the extensibility/reducibility determination is reducible, the second usage rate being equal to or higher than the first usage rate, and the second processing performance being equal to or higher than the first processing performance.

11. A non-volatile memory device, comprising:
a non-volatile memory; and
a plurality of resources which includes resources of a plurality of types and which are connected to the non-volatile memory, wherein
the plurality of resources which includes one or more processors,
at least a part of the non-volatile memory is constituted by a user area that is a storage area into which data is to be written and an update area that is a storage area into which update data for the data is to be written, and the one or more processors is configured to change a user capacity that is a capacity of the user area to a user capacity in accordance with a determination based on at least one of one or more resource usage rates, wherein with respect to the non-volatile memory, a change in a user capacity is further based on an asynchronous processing performance with respect to the non-volatile memory, and wherein with respect to the non-volatile memory device, any of the non-volatile memory and the one or more processors is configured to execute an extensibility/reducibility determination that is a determination of a user capacity of the non-volatile memory being any of extensible, reducible, and unchangeable based on a resource usage rate of the non-volatile memory and an asynchronous processing performance of the non-volatile memory;

wherein the non-volatile memory device is configured to execute:
  a write process that is a process of writing, in response to a write command, write target data in accordance with the write command into the non-volatile memory of the non-volatile memory device; and
  an asynchronous process that is a process performed asynchronously with the write process, wherein with respect to the non-volatile memory device, a change in a user capacity is based on a result of the extensibility/reducibility determination with respect the non-volatile memory device, and wherein with respect to the non-volatile memory device,
  when the resource usage rate of the non-volatile memory device is lower than a first usage rate and the asynchronous processing performance of the non-volatile memory device is lower than a first processing performance, the result of the extensibility/reducibility determination is extensible, and
  when the resource usage rate of the non-volatile memory device is equal to or higher than a second usage rate and the asynchronous processing performance of the non-volatile memory device is equal to or higher than a second processing performance, the result of the extensibility/reducibility determination is reducible, the second usage rate being equal to or higher than the first usage rate, and the second processing performance being equal to or higher than the first processing performance.

\* \* \* \* \*